United States Patent
Kim et al.

(10) Patent No.: US 10,595,289 B2
(45) Date of Patent: Mar. 17, 2020

(54) METHOD AND APPARATUS FOR DETECTING SYNCHRONIZATION SIGNAL IN WIRELESS COMMUNICATION SYSTEM

(71) Applicant: Samsung Electronics Co., Ltd., Gyeonggi-do (KR)

(72) Inventors: Donghan Kim, Gyeonggi-do (KR); Yongjun Kwak, Gyeonggi-do (KR); Taehyoung Kim, Seoul (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/879,952

(22) Filed: Jan. 25, 2018

(65) Prior Publication Data
US 2018/0213495 A1    Jul. 26, 2018

(30) Foreign Application Priority Data
Jan. 25, 2017    (KR) .................. 10-2017-0012240

(51) Int. Cl.
| | | |
|---|---|---|
| *H04W 56/00* | (2009.01) | |
| *H04L 7/00* | (2006.01) | |
| *H04L 27/26* | (2006.01) | |
| *H04W 48/10* | (2009.01) | |

(52) U.S. Cl.
CPC ....... *H04W 56/001* (2013.01); *H04L 27/2656* (2013.01); *H04W 48/10* (2013.01)

(58) Field of Classification Search
CPC .. H04L 27/2655; H04W 56/00; H04W 56/001
See application file for complete search history.

(56) References Cited

U.S. PATENT DOCUMENTS

| | | | |
|---|---|---|---|
| 2013/0250818 A1* | 9/2013 | Gaal ................ | H04W 56/00 370/277 |
| 2014/0198663 A1 | 7/2014 | Xu et al. | |
| 2016/0353440 A1* | 12/2016 | Lee ................ | H04W 4/70 |
| 2017/0006578 A1* | 1/2017 | Rico Alvarino ...... | H04L 1/0038 |
| 2017/0054538 A1* | 2/2017 | Pu .................... | H04W 56/001 |
| 2017/0251446 A1* | 8/2017 | Sun .................. | H04W 56/0035 |
| 2017/0353257 A1* | 12/2017 | Islam ................ | H04J 3/0617 |
| 2018/0184391 A1* | 6/2018 | Ly .................... | H04W 56/0015 |
| 2018/0368092 A1* | 12/2018 | Wang ................ | H04W 56/0025 |
| 2019/0013984 A1* | 1/2019 | Liang ................ | H04L 27/2656 |

(Continued)

FOREIGN PATENT DOCUMENTS

WO    WO-2017129100 A1 *    8/2017    ............ H04W 56/00

OTHER PUBLICATIONS

Abelmohsen Ali et al., "Employing Broadcast Channel for Frequency Tracking in LTE-MTC Systems", IEEE Wireless Communications Letters, vol. 5, No. 4, Aug. 1, 2016, 4 pages.

(Continued)

*Primary Examiner* — Scott M Sciacca
(74) *Attorney, Agent, or Firm* — The Farrell Law Firm, P.C.

(57) ABSTRACT

Disclosed is a method and apparatus for performing, by a terminal, time and frequency synchronization with a base station in an initial access process to the base station. The method includes receiving, by the terminal, a physical broadcast channel, and detecting a synchronization signal based on the received physical broadcast channel.

16 Claims, 15 Drawing Sheets

(56) References Cited

U.S. PATENT DOCUMENTS

2019/0044690 A1* 2/2019 Yi .............................. H04L 5/14

OTHER PUBLICATIONS

ETSI: Digital Cellular Telecommunications System (Phase 2); Radio Subsystem Synchronization (GSM 05.10), ETS 300 579, Fifth Edition, Aug. 1, 1996, 15 pages.
Wen Xu et al., "Robust Synchronization for 3GPP LTE System", IEEE Global Telecommunications Conference, Dec. 6, 2010, 5 pages.
European Search Report dated May 15, 2018 issued in counterpart application No. 18153291.2-1219, 9 pages.

* cited by examiner

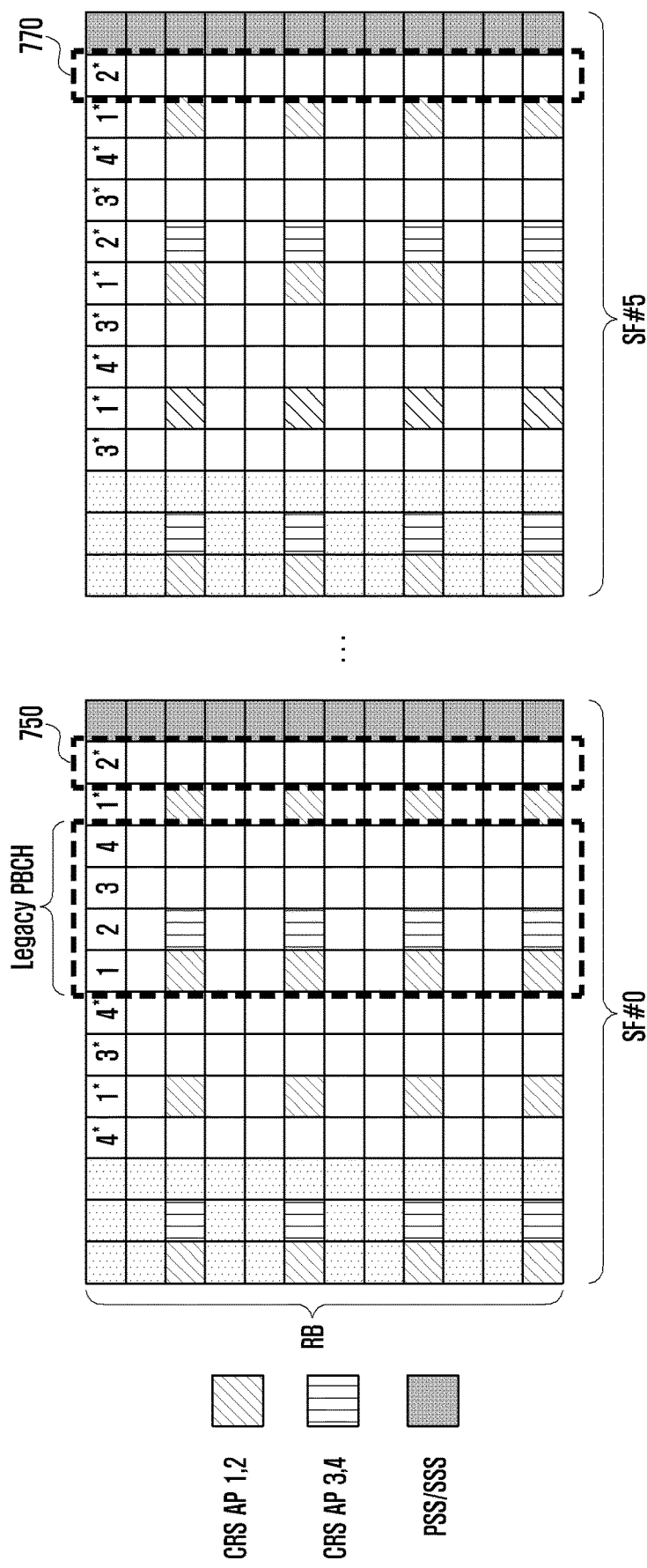

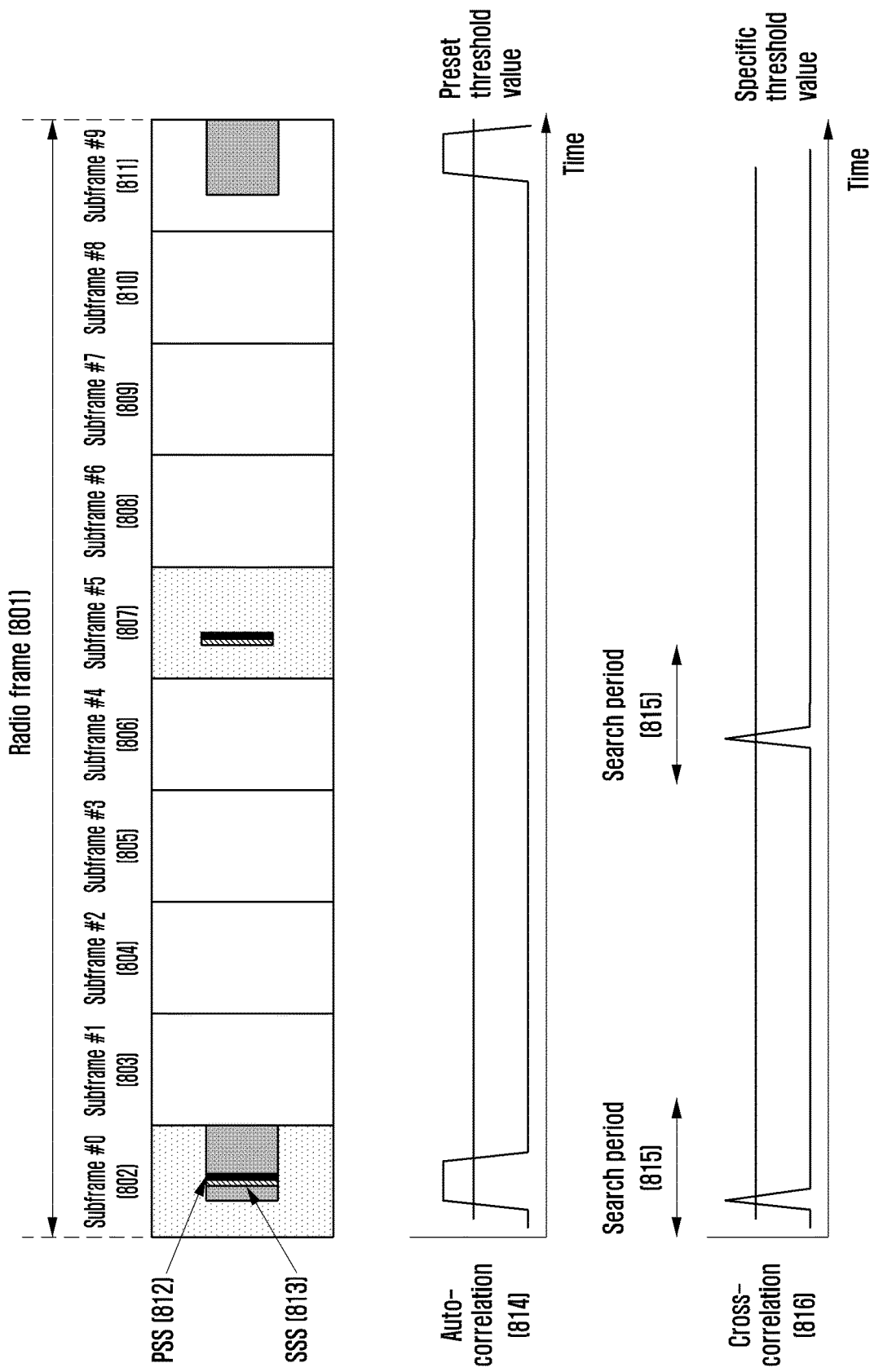

METHOD AND APPARATUS FOR DETECTING SYNCHRONIZATION SIGNAL IN WIRELESS COMMUNICATION SYSTEM

PRIORITY

This application claims priority under 35 U.S.C. § 119(a) to a Korean Patent Application filed in the Korean Intellectual Property Office on Jan. 25, 2017 and assigned Serial number 10-2017-0012240, the contents of which are incorporated herein by reference.

BACKGROUND

1. Field of the Disclosure

The present disclosure relates generally to a mobile terminal, and more particularly, to a method and apparatus for performing, by a terminal requiring low power consumption and low terminal complexity, time and frequency synchronization with a base station in an initial access process.

2. Description of the Related Art

To meet the increasing demand for radio data traffic since commercialization of the 4th-generation (4G) communication system, research has been performed to develop an improved 5th generation (5G or pre-5G) communication system, which is also referred to as a beyond 4G network communication system or a post long term evolution (LTE) system.

To achieve a high data transmission rate, the 5G communication system is considered to be implemented in a super high frequency (mmWave) band, such as 60 gigahertz (GHz). To relieve a path loss of a radio wave and increase a transfer distance of the radio wave in the super high frequency band, the 5G communication system may implement beamforming, massive multi-input multi-output (massive MIMO), full dimensional MIMO (FD-MIMO), array antenna, analog beam-forming, and large scale antenna technologies.

To improve a network of the system, in the 5G communication system, technologies such as evolved small cell, advanced small cell, cloud radio access network (cloud RAN), ultra-dense network, device to device communication (D2D communication), wireless backhaul, moving network, cooperative communication, coordinated multi-points (CoMP), and received interference cancellation have been developed.

In addition, in the 5G system, hybrid frequency shift keying (FSK), quadrature amplitude modulation (QAM) modulation (FQAM) and sliding window superposition coding (SWSC) advanced coding modulation (ACM) schemes, and a filter bank multi carrier (FBMC), a non-orthogonal multiple access (NOMA), and a sparse code multiple access (SCMA) advanced access technologies, have been developed.

The Internet is evolving from a human-centric communication network in which information is generated and consumed by humans to the Internet of things (IoT) network in which distributed components exchange and process information. Internet of everything (IoE) technology is another example in which big data processing technology through connection with a cloud server is combined with IoT.

In order to implement IoT, technological elements such as a sensing technology, communication and network infrastructure, a service interface technology, and a security technology are required. Recently, technologies such as a sensor network, machine to machine (M2M), and machine type communication, for connection between things have been studied.

In the IoT environment, it is possible to provide an intelligent Internet technology (IT) that is capable of collecting and analyzing data generated from connected things to create new values for human life. IoT may be applied to various fields such as smart home, smart building, smart city, smart car or connected car, smart grid, health care, smart appliance, and advanced medical service through existing IT and fusion and convergence between various industries.

Thus, there have been various attempts to apply the 5G communication system to the IoT network. For example, the sensor network, Machine to Machine (M2M), and Machine Type Communication (MTC) technologies are implemented by means of 5G communication technologies such as beamforming, MIMO, and array antenna. The application of the above-described cloud RAN as a big data processing technology is an example of convergence between the 5G and IoT technologies.

A communication system has been developed as a broadband communication system providing a high-speed and high-quality packet data service, such as high speed packet access (HSPA) of 3rd generation partnership project (3GPP), LTE or evolved universal terrestrial radio access (E-UTRA), high rate packet data (HRPD) of 3GPP2, ultra mobile broadband (UMB), and 802.16e of institute of electrical and electronics engineers (IEEE), rather than only providing early voice-oriented services.

In such a communication system, a terminal performs synchronization and cell search using an initial signal (that is, a primary synchronization signal (PSS)) received from a base station and a secondary synchronization signal to receive broadcast information, and then performs communication with the base station.

Currently, however, synchronization of a terminal in the 5G system is problematic, such that unnecessary power consumption is incurred. As such, there is a need in the art for a method and apparatus that cures this problem and improves the performance of the terminal in the wireless communication system.

SUMMARY

The present disclosure has been made in order to solve the above problems and to provide the advantages below. Accordingly, an aspect of the present disclosure is to provide an apparatus and method capable of reducing power consumption in performing, by a terminal, time and frequency synchronization in a wireless communication system.

Another aspect of the present disclosure is to provide an apparatus and method for performing, by a terminal, an auto-correlation operation for a received signal in a wireless communication system.

Another aspect of the present disclosure is to provide a method and apparatus for estimating an approximate PSS transmission timing using a repeated physical broadcast channel (PBCH) transmitted from a base station, and detecting a PSS in a PSS search period decreased based on the approximate PSS transmission timing in a wireless communication system.

Another aspect of the present disclosure is to provide a method and apparatus that enable implementation of a terminal suitable for IoT by reducing an operation amount and a power consumption amount required for performing initial access by a terminal.

In accordance with an aspect of the present disclosure, a method of a terminal includes receiving a physical broadcast channel, and detecting a synchronization signal based on the received physical broadcast channel.

In accordance with another aspect of the present disclosure, a terminal includes a communication unit configured to receive a physical broadcast channel, and a controller configured to detect a synchronization signal based on the received physical broadcast channel.

BRIEF DESCRIPTION OF THE DRAWINGS

The above and other aspects, features, and advantages of embodiments of the present disclosure will be more apparent from the following description taken in conjunction with the accompanying drawings, in which:

FIGS. 7A, 7B, and 7C illustrate an example of a pattern in which a physical broadcast channel is repeated according to an embodiment of the present disclosure;

FIG. 8 illustrates a method for setting a search period according to a repetition pattern of a physical broadcast channel according to an embodiment of the present disclosure;

DETAILED DESCRIPTION

Embodiments of the present disclosure will be described in detail with reference to the accompanying drawings. Hereinafter, when it is determined that the detailed description of the known art related to the present disclosure may obscure the gist of the present disclosure, the detailed description thereof will be omitted. The following terminologies are defined in consideration of the functions in the present disclosure and may be construed in different ways by users, an intention of operators, or conventions. Therefore, the definitions thereof should be construed based on the contents throughout the specification. The following will describe a technology for receiving, by a terminal, broadcast information from a base station in a wireless communication system, and relates to a communication technique and system in which a 5G communication system for supporting higher data transmission rate after a 4G system converges with an IoT technology.

The present disclosure may be applied to intelligent services, such as smart home, smart building, smart city, smart car or connected car, healthcare, digital education, retail business, security and safety-related services, based on a 5G communication technology and an IoT-related technology.

Hereinafter, terms referring to broadcast information, control information, communication coverage, event or state change, network entities, messages, and components of an apparatus are used in the following description for convenience of explanation. Accordingly, the present disclosure is not limited by the terms described below, and other terms having the same technical meaning may be used.

Hereinafter, some terms and names are defined in a 3rd generation partnership project long term evolution (3GPP LTE) standard. However, the present disclosure is not limited thereto, and may be identically applied to systems according to different standards.

First, a method for transmitting a synchronization signal and broadcast information in a communication system to which the present disclosure is applied will be described.

An LTE system, as a representative example of a communication system, uses an orthogonal frequency division multiplexing (OFDM) scheme in a downlink, and a single carrier frequency division multiple access (SC-FDMA) scheme in an uplink, as multiple access schemes. The multiple access scheme as described above is generally allocated and operated so that time-frequency resources for carrying data or control information for each user do not overlap with each other. That is, orthogonality is implemented, thereby classifying data or control information of each user. Hereinafter, embodiments of the present disclosure will be described under an assumption that the communication system is the LTE system, but the present disclosure is also applicable to other communication systems.

Figure 1:
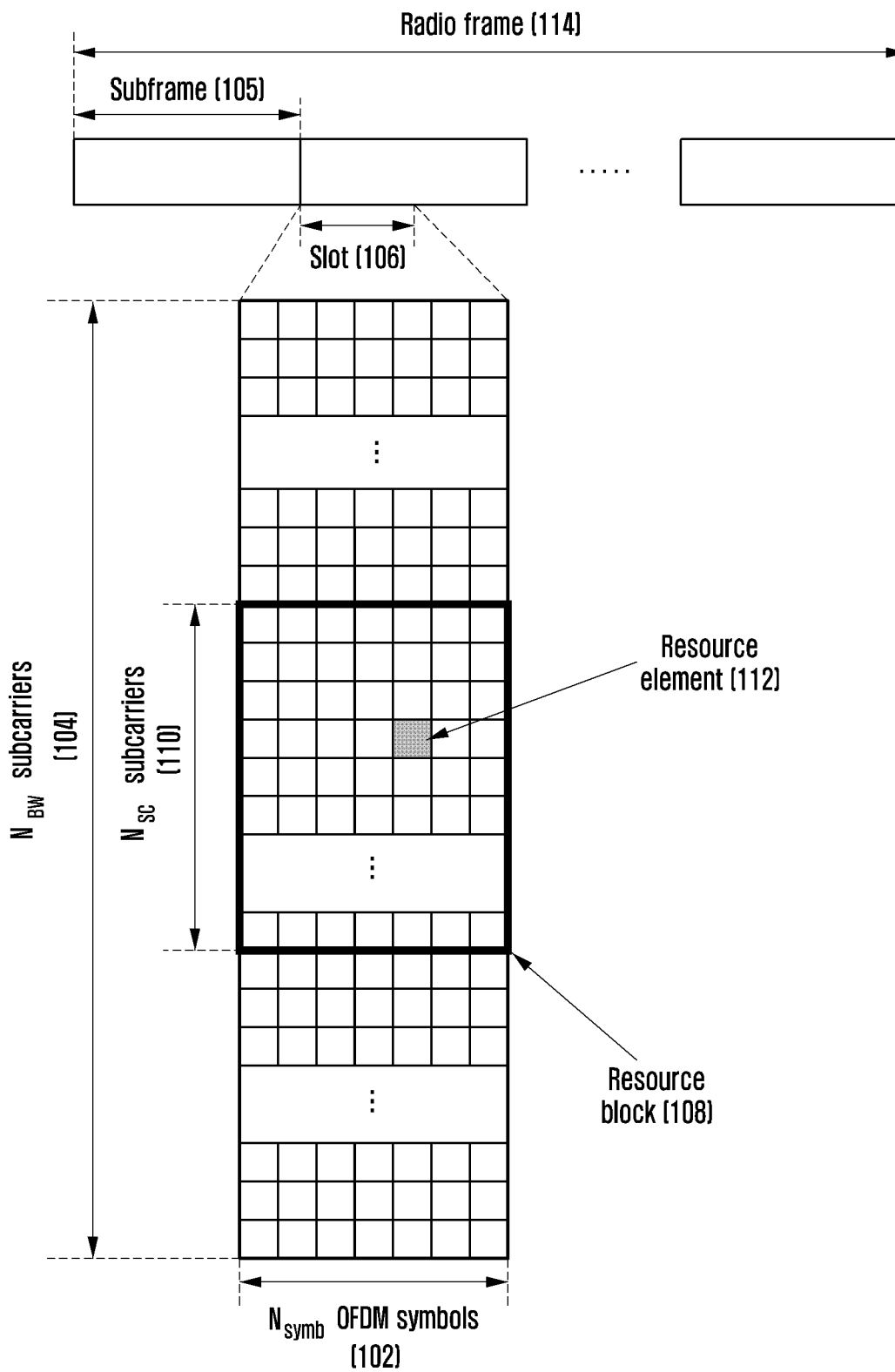
FIG. 1 illustrates a downlink frame structure of a wireless communication system according to an embodiment of the present disclosure.

FIG. 1 illustrates a downlink frame structure of a wireless communication system according to an embodiment of the present disclosure.

More specifically, FIG. 1 illustrates a basic frame structure of a time-frequency domain that is a wireless resource region in which a data or control channel is transmitted in the downlink.

Referring to FIG. 1, in multiple rectangular figures, a horizontal axis represents a time domain, and a vertical axis represents a frequency domain. A minimum transmission unit in the time domain is an OFDM symbol, $N_{symb}$ OFDM symbols 102 configure one slot 106, and 2 slots configure one subframe 105. In the present specification, description is provided on the assumption that a length of one slot 106 is 0.5 ms, and a length of subframe 105 is 1.0 ms, but the present disclosure is not limited thereto, and the length of one slot and the length of one subframe can be different from those described above.

One radio frame 114 is a time domain unit configured of 10 subframes.

A minimum transmission unit in the frequency domain is a subcarrier, and a bandwidth of the entire system transmission band is configured of a total of $N_{BW}$ subcarriers 104.

In the time-frequency domain, a basic unit of a resource is a resource element (RE) 112, which may be indicated by an OFDM symbol index and a subcarrier index. A resource block (RB) (or physical resource block, PRB) 108 is defined as $N_{symb}$ continuous OFDM symbols 102 in the time domain and $N_{SC}$ continuous subcarriers 110 in the frequency domain. Therefore, one RB 108 is configured of $N_{symb} \times N_{SC}$ REs 112, and a system transmission band is configured of a total of $N_{RB} = (N_{BW}/N_{SC})$ resource blocks.

Generally, a minimum transmission unit of the data is the RB described above. In the LTE system, $N_{symb}=7$, $N_{SC}=12$, and $N_{BW}$ and $N_{RB}$ are in proportion to the bandwidth of the system transmission band. The LTE-A system defines and operates 6 transmission bandwidths, and a data rate is increased in proportion to the number of RBs scheduled to the terminal. In the FDD system operated by dividing the downlink and the uplink with frequency, a transmission bandwidth of the downlink and a transmission bandwidth of the uplink may be different from each other. A channel bandwidth represents an RF bandwidth corresponding to the system transmission bandwidth. Table 1, provided below, shows a corresponding relationship between the system transmission bandwidth and the channel bandwidth defined in the LTE system. For example, in an LTE system having 10 MHz of channel bandwidth, a transmission bandwidth thereof is configured of 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within first N OFDM symbols in subframe. In general, N={0, 1, 2}. The N value is determined depending on an amount of control information to be transmitted in the current subframe. Thus, N varies for each subframe. The control information includes a control channel transmission period indicator indicating the number of OFDM symbols over which the control information is transmitted, scheduling information for downlink data or uplink data, and hybrid automatic repeat request (HARQ) response (ACK/NACK) signals, for example.

A modulation scheme supported by the LTE system is one of quadrature phase shift keying (QPSK), 16 quadrature amplitude modulation (QAM), and 64 QAM. A modulation order ($Q_m$) thereof is 2, 4, and 6, respectively. That is, by the base station, 2 bits per symbol may be transmitted in QPSK, 4 bits per symbol may be transmitted in 16 QAM, and 6 bits per symbol may be transmitted in 64 QAM.

When a power supply of the terminal is turned on, the terminal performs an initial access process. The base station transmits a primary synchronization signal (PSS) and a secondary synchronization signal (SSS) so that the terminal present in a cell performs time and frequency synchronization and may obtain cell information, and transmits, to the terminal, information required for the terminal to access the base station by using a master information block (MIB) and a system information block (SIB). The MIB is transmitted through a fixed time and frequency resource through a PBCH, and the SIB is transmitted to the terminal through a physical downlink shared channel (PDSCH).

In the initial access process, the terminal performs the time and frequency synchronization and detects a cell identifier (ID) using the PSS and the SSS transmitted from the base station. In addition, the terminal that completed the time and frequency synchronization with the base station may obtain the MIB by receiving the PBCH, and may then obtain the SIB, thereby receiving all broadcast information for accessing the base station. The base station may not know presence of the terminal until the terminal is turned on and obtains the broadcast information. Accordingly, the terminal performs a random access procedure after obtaining the broadcast information to access the base station.

The LTE system operating as described above may support a low-cost and low complexity terminal (low-cost/low-complexity user equipment (UE) or low-cost terminal) with limitation on some functions thereof. The low-cost terminal may be used for a machine type communication (MTC) or a machine to machine (M2M) service having a main purpose of providing services such as remote metering, security service, and logistics, and may be used as a means capable of realizing cellular-based IoT.

As such, in order to realize low cost and low complexity, the number of receiving antennae of the terminal is limited to 1, thereby reducing costs of an RF device of the terminal. Alternatively, an upper limit of a transport block size (TBS) that the low-cost terminal may process is defined to decrease a soft buffer size used for data reception of the terminal, thereby reducing the soft buffer costs. The terminal in a general LTE system transmits and receives a broadband signal with respect to a minimum bandwidth of 20 MHz regardless of a bandwidth of a system transmission band, whereas the low-cost terminal may realize additional reduction in cost and complexity by limiting a maximum RF bandwidth that the low-cost terminal supports below 20 MHz. For example, in the LTE system with 20 MHz channel bandwidth, an operation of the low-cost terminal may be defined to support only 1.4 MHz channel bandwidth.

The low-cost terminal has low mobility due to the MTC/M2M service or IoT service, but reception performance may deteriorate, for example, due to its location under a building where people may not access and low complexity of the terminal, thereby decreasing communication coverage of the terminal. Therefore, a method for improving the communication coverage of the low-cost terminal is needed.

The terminal requiring improvement of the communication coverage requires improvement of about 15 decibels (dB) to 20 dB as compared to a coverage provided by the conventional LTE terminal. That is, the terminal requiring improvement of the communication coverage should be able to perform communication with the base station even for the reception signal having a level lower by 15 dB to 20 dB as compared to the conventional terminal. In order to improve the communication coverage of the terminal, repetitive transmission or bundling of the existing physical channel or a newly defined physical channel is required. The repetitive transmission indicates that transmission is repetitively performed multiple times with the same subframe including information to be transmitted. The bundling indicates that the same information is transmitted multiple times through a plurality of subframes, but is transmitted in a different HARQ redundancy version or different physical channel for each subframe.

A reception device of the base station and the terminal may improve the communication coverage as compared to the general physical channel, by soft combining or accumulating the physical channel signal that is repetitively transmitted or is transmitted while being bundled. At this time, a repetition level required to improve the communication coverage may be different for each physical channel used for uplink and downlink. A repetition level required for the respective terminals to simultaneously have the same communication coverage may be different, and may represent the number of repetitions of a physical subframe, or an indication value for the number of actually used repetitions.

Hereinafter, the repetition and bundling are interpreted as similar methods in relation to the improvement of the communication coverage. Therefore, even when only one is mentioned, it should be understood as including both of repetition and bundling. The improvement of the communication coverage has been described mainly with the low-cost terminal, but may be identically applied to all terminals requiring improvement of the communication coverage, in addition to the low-cost terminal.

Table 2, provided below, shows a performance gain of a PBCH required for the LTE-based low-cost terminal to improve the communication coverage by 15 dB or more as compared to a current LTE category 1 terminal. As described above, the PBCH is a physical channel through which the base station transmits the MIB including broadcast information required for initial access and communication of the terminal. The LTE category 1 terminal supports the lowest data rate based on release-8, a version of the LTE standard.

TABLE 2

|  | PUSCH | PBCH | PSS/SSS |
|---|---|---|---|
| MCL for normal LTE (LTE category 1 terminal) | 140.7 dB | 149.0 dB | 149.3 dB |
| MCL target for MTC UE | 155.7 dB | 155.7 dB | 155.7 dB |
| Required enhancement to reach 15 dB for New complexity UEs(1 Rx) | 19 dB | 10.7 dB | 10.4 dB |

In Table 2, a maximum coupling loss (MCL) is a maximum loss value for enabling communication between a transmission device and a reception device. That is, communication is possible only when path-loss or hardware losses between the transmission device and the reception device is less than the MCL value shown in Table 2.

In the LTE system, a physical uplink shared channel (PUSCH) used by the terminal for transmitting data to the base station has the lowest MCL value, thus the communication coverage of the PUSCH is relatively less than other channels. Accordingly, in order to improve the communication coverage of the low-cost terminal by 15 dB as compared to the conventional category 1 terminal, the communication coverage needs to be improved by 15 dB based on the MCL of the PUSCH. For the reason described above, a target MCL required for improving the communication coverage of the PUSCH of the low-cost terminal is 155.7 dB, and there is a need to design so that all channels may satisfy the target MCL of 155.7 dB.

In Table 2, referring to the PBCH of the MTC terminal, a performance gain of 6.7 dB as compared to the category 1 terminal is required in order to satisfy the MCL of 155.7 dB. However, the category 1 terminal has two receiving antennas and may perform communication in the entire system band, whereas, the low-cost terminal uses a single receiving antenna, thus communication coverage degradation by 3 dB occurs. Further, since a reception frequency band of the low-cost terminal is narrowband, such as 1.4 megahertz (MHz) as compared to the category 1 terminal, in terms of a diversity gain, communication coverage degradation by about 1 dB occurs.

In consideration of such communication coverage degradation, additional performance improvement is required for the low-cost terminal to improve the coverage by 15 dB as compared to the category 1 terminal, and the value may be generally 3 to 4 dB. Therefore, in order for the low-cost terminal to improve the communication coverage by 15 dB as compared to the category 1 terminal, the PBCH requires a performance gain of 10.7 dB. Similarly, in terms of reception of the PSS and the SSS, in order for the low-cost terminal to improve the communication coverage by 15 dB as compared to the category 1 terminal, a performance gain of 10.4 dB is required. As described above, the performance gain required for improving the communication coverage may be obtained by using additional repetitive transmission and bundling of the corresponding physical channel and signal.

An embodiment for expansion of the communication coverage includes repetitively receiving or transmitting, by the terminal, the same initial signal from and to the base station. However, if the repetition of the signal transmitted from the base station is insufficient, the terminal may not receive the PBCH of the base station depending on a location or situation of the terminal, and thus may not perform communication with the base station. As an example, when the terminal is a smart meter or a fixed sensor used in an area under shadow such as a basement of a building, since the terminal may not move, if the terminal does not receive a broadcast signal from the base station, communication with the base station may not be continuously performed. Therefore, the base station may transmit the PBCH using additional repetition within a predetermined frame such that the terminal used in the area under shadow receives the PBCH. The terminal may perform combining with respect to the PBCH repetitively transmitted from the base station, thereby improving the communication coverage.

Figure 2:
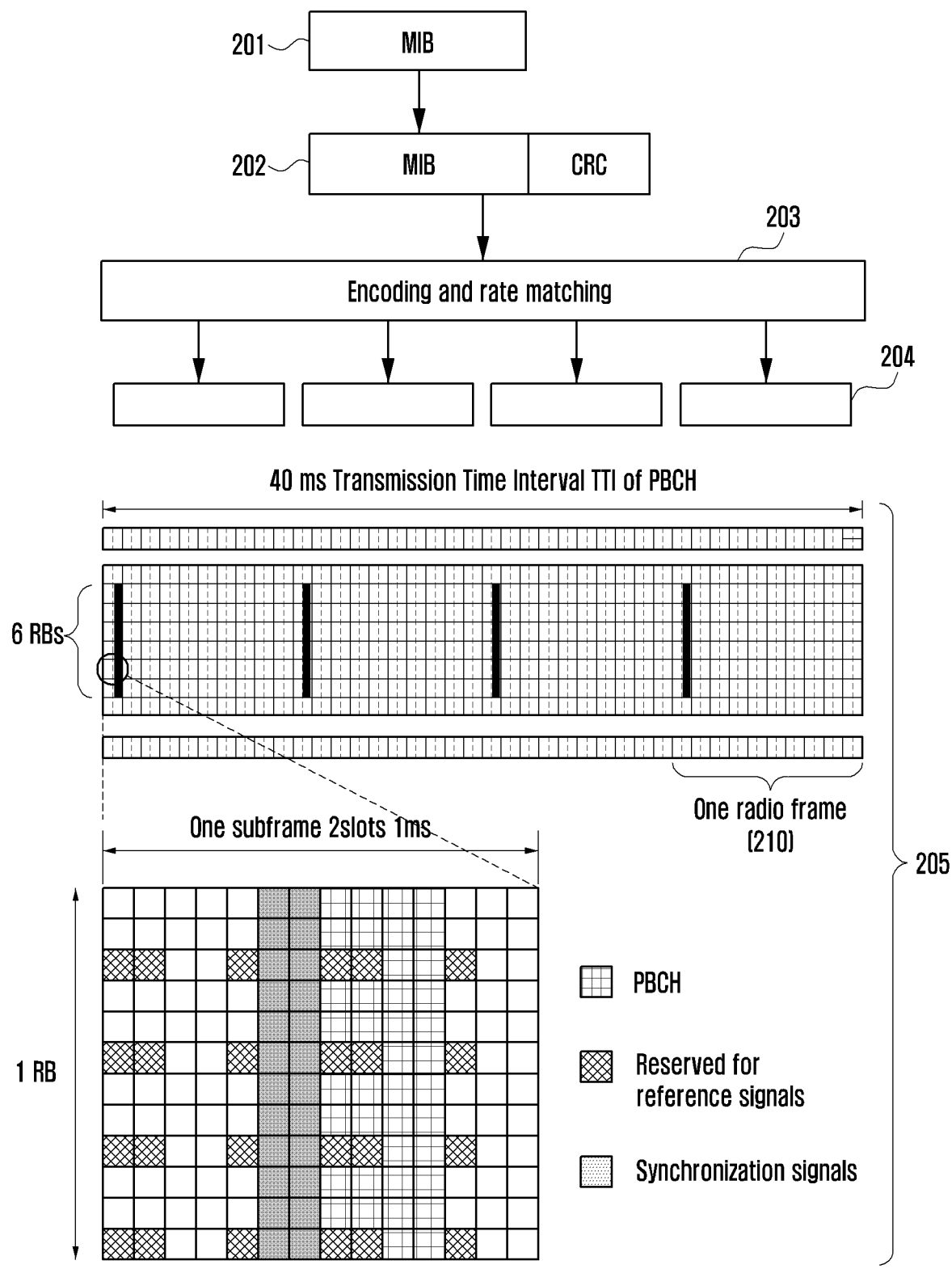
FIG. 2 illustrates a method for transmitting, by a base station, a master information block (MIB) to a terminal using a PBCH in a wireless communication system according to an embodiment of the present disclosure.

FIG. 2 illustrates a method for transmitting, by a base station, an MIB to a terminal using a PBCH in a wireless communication system according to an embodiment of the present disclosure.

Referring to FIG. 2, the base station generates one MIB 201 including broadcast information required for initial access of the terminal. The MIB is configured of 24 bits, i.e., 3 bits of downlink system bandwidth information, 3 bits of physical HARQ indicator channel configuration information, 8 bits of system frame number (SFN), and 10 extra bits. Additionally, 1 bit or 2 bits of information for informing whether the base station supports a communication coverage expansion mode for the terminal requiring the communication coverage expansion may be added to the MIB. The term "communication coverage expansion" may be replaced by terms such as "broadcast information coverage expansion" or "PBCH coverage expansion".

Referring to FIG. 2, the base station adds cyclic redundancy check (CRC) bits configured of 16 bits to the MIB 201 of 24 bits to generate an MIB bit string 202 configured of a total of 40 bits. The CRC bits are for checking whether an error bit is included in the MIB of 24 bits in the MIB bit string received by the terminal from the base station. As an example, the base station divides the MIB of 24 bits by a predefined 16th order generator polynomial, obtains the CRC bits by performing an exclusive-OR between a mask bit sequence determined depending on the number of antenna ports used for PBCH transmission by the base station and the rest of the bit string, and transmits the corresponding CRC bit string added to the MIB 201.

Then, the base station performs a channel encoding and rate matching operation 203 to transmit the MIB bit string 202, by encoding the MIB bit string of 40 bits into a tail biting convolutional code (TBCC) having a coding rate of ⅓ and rate matching is appropriately performed according to the number of REs used for the PBCH transmission, which number may be different depending on a duplex mode. Through such a channel encoding and rate matching operation 203, the base station may allow robustness against the PBCH transmission from the base station to the terminal.

Channel encoding bits used in the channel encoding process are configured of a total of 1920 bits in a system using a normal cyclic prefix (CP), and are configured of 1760 bits when using an extended CP. The base station segments the channel encoding bits configured of 1920 bits or 1760 bits into four MIB bit strings 204. Reference numeral 205 indicates the four MIB bit strings 204 transmitted to the terminal through the PBCH by the base station.

At this time, the PBCH is transmitted in a first subframe of each of four radio frames 210 configuring 40 ms. The PBCH is mapped to 6 RBs positioned in the middle of the system bandwidth on the frequency. When the base station uses frequency division multiplexing (FDD) and the normal CP, the PBCH is mapped to first four OFDM symbols of a second slot configuring subframe on the time. The above-described four MIB bit strings 204 is transmitted through four PBCHs in order within 40 ms.

The four MIB bit strings 204 are scrambled with a scrambling sequence, respectively, and a scrambling sequence generator is initialized by a cell ID once every 40 ms. The PBCHs transmitted in each radio frame use different scrambling sequences from each other.

The terminal performs descrambling using four different scrambling sequences for the PBCHs received in one radio frame and performs decoding. Thereafter, the terminal checks the CRC bits, and if there is no error, may determine a reception point in time of the PBCH in 40 ms. If the terminal is not adjacent to the base station and thus reception power is insufficient, the MIB may be checked by receiving all four PBCH signals and then decoding the channel signals through the combining process. If no error is included in the decoded MIB, the terminal may obtain downlink system frequency information, PHICH configuration information, and SFN information which are broadcast information included in the MIB, and perform communication with the base station using the obtained broadcast information.

That is, the terminal receives the PBCH to perform descrambling by the scrambling sequence, combines the segmented bit strings, and then performs the channel decoding. For the decoded bit strings, the terminal calculates CRC bits in the same manner as the base station for the MIB of 24 bits received from the base station, and determines whether an error occurs in the received MIB of 24 bits by comparing the determined CRC bits and the received CRC bits.

For example, if the determined CRC bits and the received CRC bits are identical, the terminal determines that there is no error in the received MIB of 24 bits. In contrast, if the determined CRC bits and the received CRC bits are different, the terminal determines that there is an error in the received MIB of 24 bits. At this time, when the terminal receives the MIB bit string from the base station, since it is not possible to know the number of antenna ports used for the PBCH transmission by the base station, the terminal should receive the PBCH with a combination of all antenna ports. That is, the terminal should compare the determined CRC bits and the received CRC bits using a mask bit string corresponding to all antenna ports.

Figure 3:
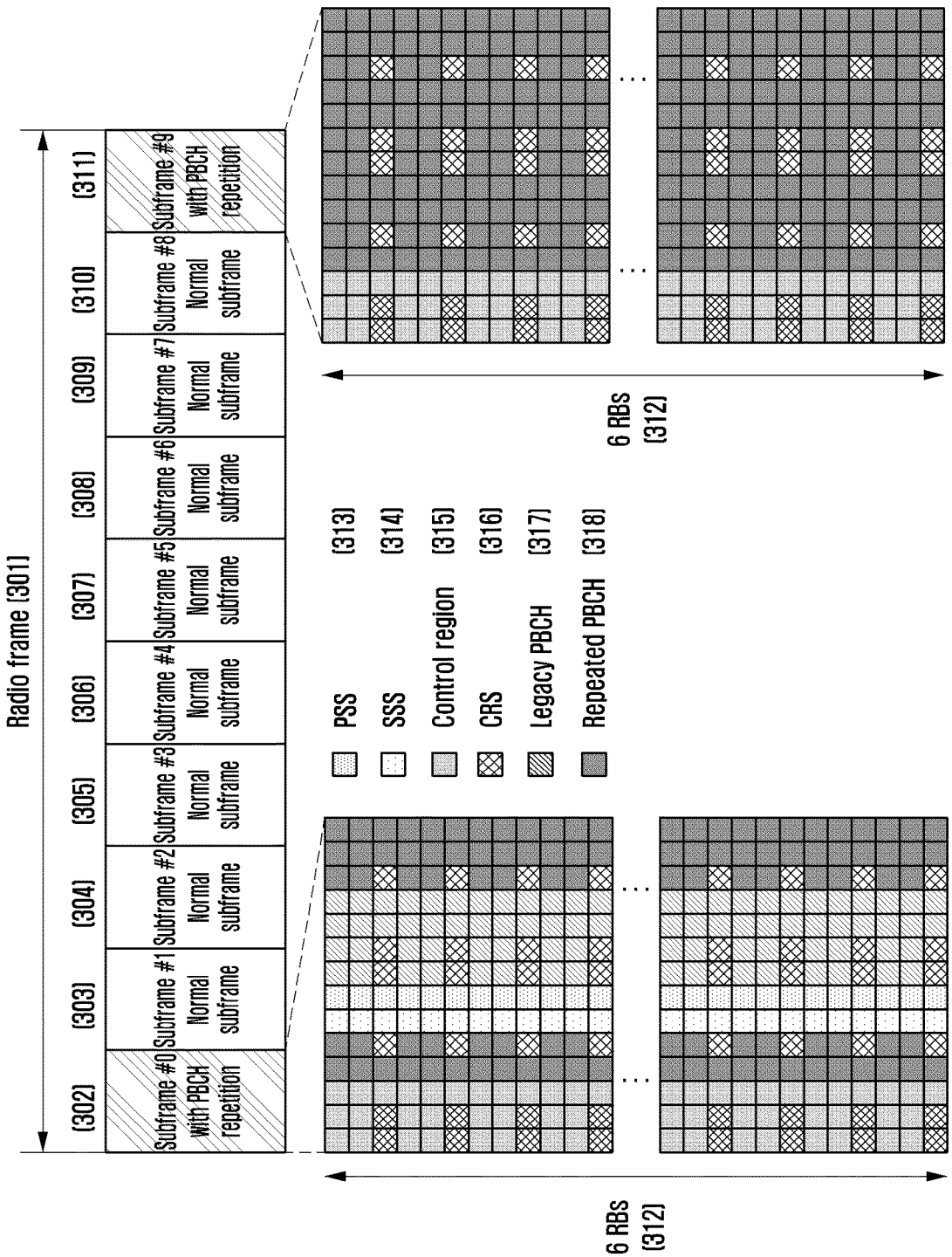
FIG. 3 illustrates a structure of a signal for repetitively transmitting a PBCH in a wireless communication system according to an embodiment of the present disclosure.

FIG. 3 illustrates a structure of a signal for repetitively transmitting a PBCH in a wireless communication system according to an embodiment of the present disclosure. More specifically, FIG. 3 illustrates an embodiment of a structure in which a PBCH is repetitively transmitted, which is considered in 3GPP LTE, for improvement of the PBCH communication coverage of the low-cost terminal.

In FIG. 3, one radio frame 301 includes 10 subframes 302 to 311. For the low-cost terminal, an MTC-PBCH is configured so that the PBCH may be transmitted in two subframes in one radio frame, unlike the conventional system. The term "MTC-PBCH" refers to a broadcast signal including both of the existing PBCH and a PBCH additionally repetitively transmitted for the coverage expansion of the terminal FIG. 3 illustrates an example in which the PBCH is transmitted in two subframes in one radio frame, i.e., is transmitted in each of subframe #0 302 and subframe #9 311. However, the present disclosure is not limited thereto. For example, in time division duplexing (TDD), the PBCH may be transmitted in each of subframe #0 302 and subframe #5 307. However, the present disclosure does not require a separate description. In FIG. 3, it is assumed that two subframes in a radio frame are used for the PBCH transmission, but the embodiment of the present disclosure is not limited to when the number of subframes in which the PBCH is repeated is 2.

Referring to FIG. 3, the existing (or legacy) PBCH 317 is transmitted in subframe #0 302, and in each of subframe #0 302 and subframe #9 311, the PBCH is additionally repetitively transmitted, i.e., is a repeated PBCH 318. The repeated PBCH 318 is repeatedly transmitted in addition to the existing PBCH 317 and may be mapped to the RE 318 region for a repeated PBCH except for RE regions for a PSS 313, an SSS 314, a control signal region (control region) 315 and a CRS 316 in six RBs 312 in the middle of the system transmission band.

For example, in the FDD system using the normal cyclic prefix, the base station may transmit, to the low-cost terminal, the PBCH a total of 4.6 times in one radio frame. Therefore, the PBCH communication coverage may be improved by about 6.6 dB as compared to the PBCH transmitted once in each radio frame.

As described with reference to Table 2, for improvement of the communication coverage corresponding to 15 dB of the low-cost terminal, in the case of PBCH, the communication coverage needs to be improved by a total of 10.7 dB. However, if the PBCH repetitively transmitted from the current base station to the low-cost terminal is used, the communication coverage may be improved only by about 6.6 dB. In current 3GPP LTE standardization for the low-cost terminal, it is assumed that the insufficient communication coverage performance gain as above may be obtained using time diversity. That is, it is expected that PBCH decoding is possible if the low-cost terminal may obtain a gain according to a channel as the channel is improved even when the communication coverage is insufficient.

As described above, the PBCH used for transmitting the MIB may be repetitively transmitted for the communication coverage expansion. That is, unlike the conventional LTE communication system, for the coverage expansion of the low-cost terminal, the base station uses the repetitive transmission using an additional time and frequency resource in addition to the existing PBCH.

Even in the process of performing, by the low-cost terminal, time and frequency synchronization using a PSS and an SSS in an initial access process, the improvement of the communication coverage is required. However, the same PSS and SSS are transmitted in one cell regardless of a transmission time at all times. More specifically, the PSS and SSS transmitted by the base station for the time and frequency synchronization are the same and transmitted on a fixed cycle regardless of time at all times. That is, if a cell ID that may represent one base station is not changed, the base station transmits the PSS and SSS configured by the same sequence every 5 ms.

If the communication coverage with the base station is sufficient, the terminal performs the time and frequency synchronization and may detect a cell ID using one PSS and one SSS. On the contrary, if the terminal is in a location where the communication coverage with the base station is insufficient, it is difficult to perform synchronization with the base station using one PSS and one SSS. In the 3GPP LTE standardization for the low-cost terminal, the additional repetitive transmission is not applied to the PSS and SSS, and the terminal may secure the communication coverage by accumulating or combining a synchronization signal transmitted every 5 ms. However, as described above, since the same PSS and SSS are repetitively transmitted on the same cycle, the terminal should perform the time and frequency synchronization with the base station by combining the PSS and SSS transmitted for a long time period, such as 100 milliseconds (ms).

Figure 4:
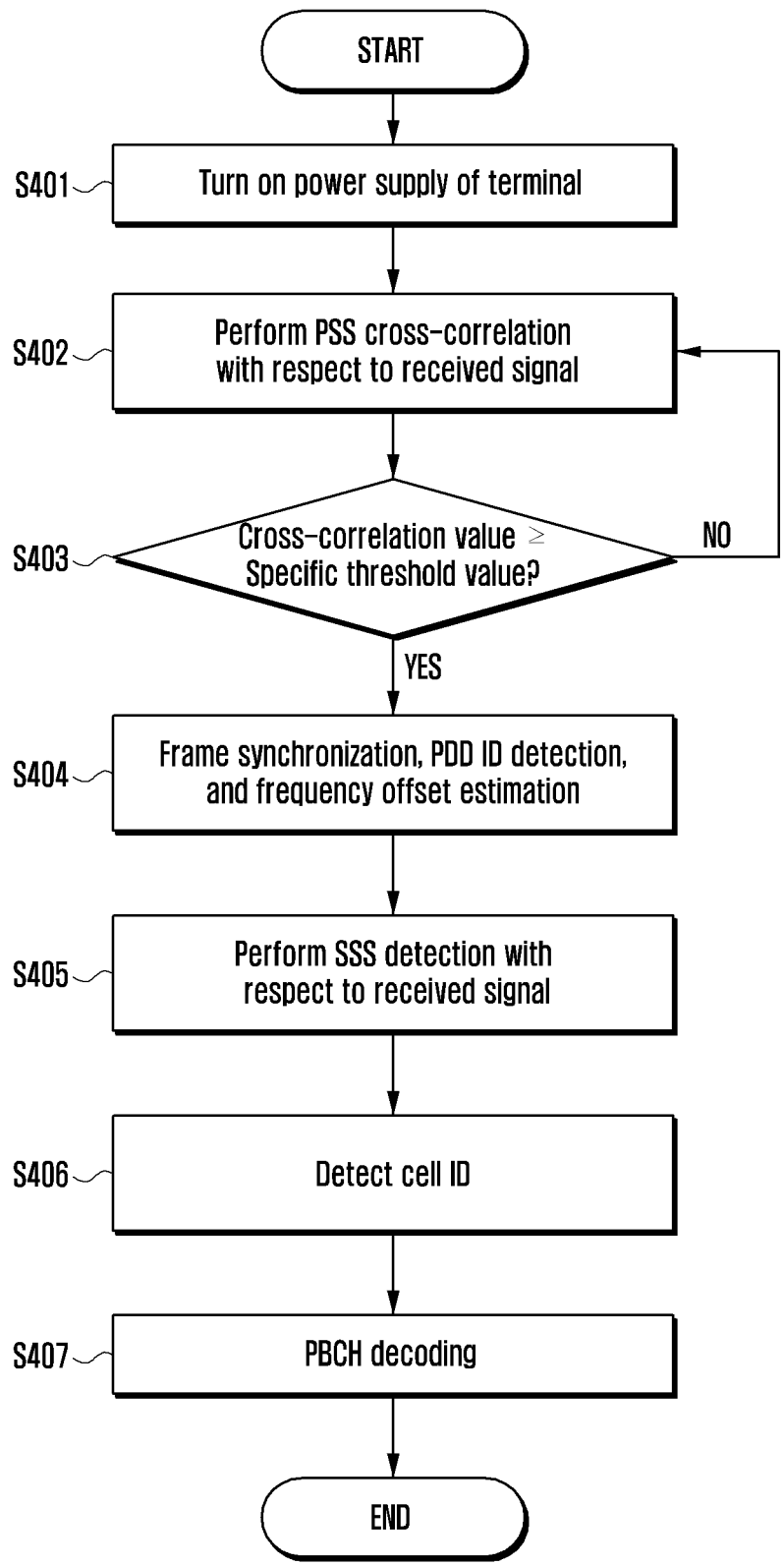
FIG. 4 illustrates a process of performing, by a terminal, synchronization using a PSS and an SSS transmitted from a base station in a wireless communication system according to an embodiment of the present disclosure.
Figure 5:
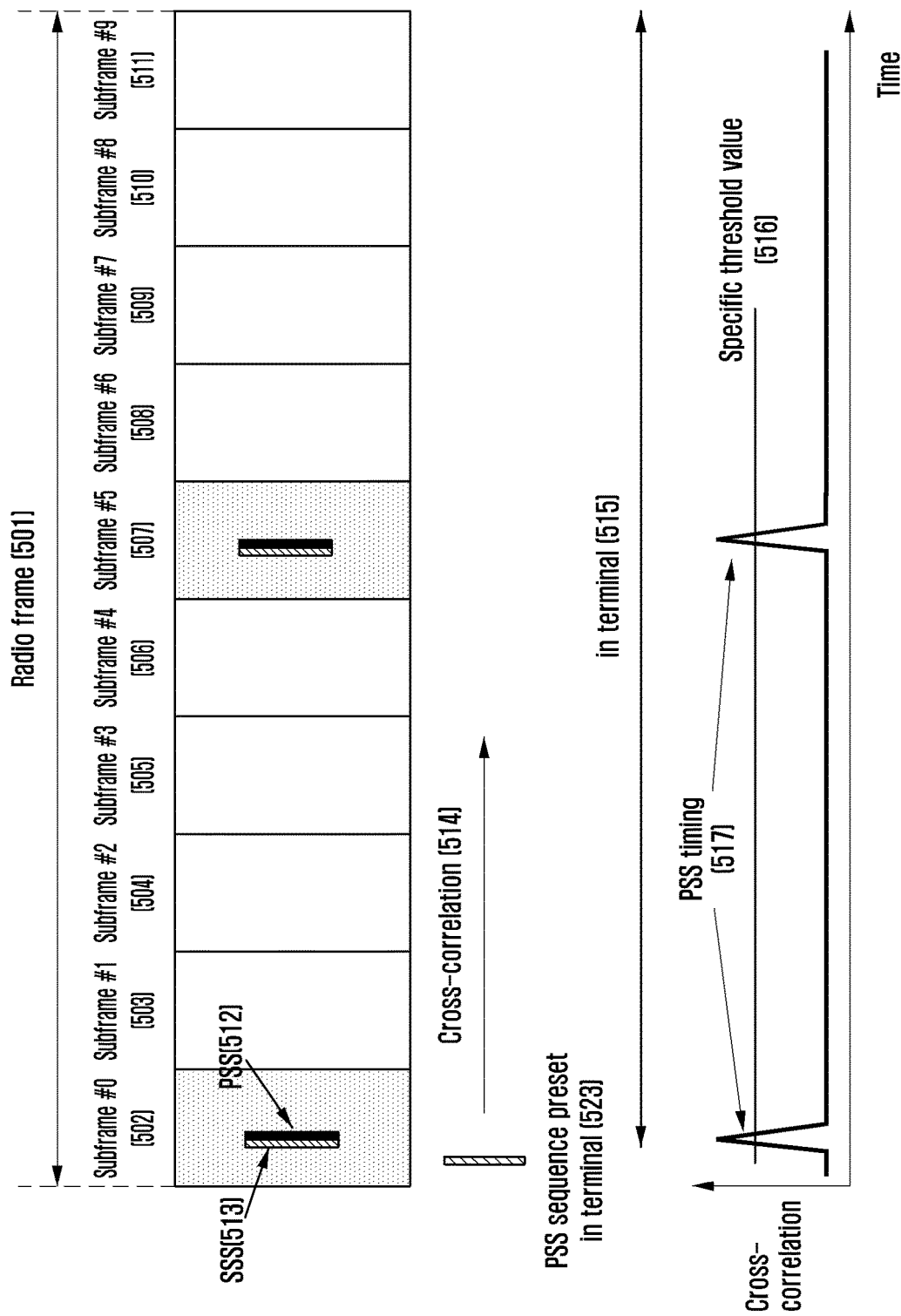
FIG. 5 illustrates a method for detecting, by a terminal, a PSS transmitted from a base station in a wireless communication system according to an embodiment of the present disclosure.

FIG. 4 illustrates a process of performing, by a terminal, synchronization using a PSS and an SSS transmitted from a base station in a wireless communication system according to an embodiment of the present disclosure and FIG. 5 illustrates a method for detecting, by a terminal, a PSS transmitted from a base station in a wireless communication system according to an embodiment of the present disclosure.

First, referring to FIG. 4, a power supply of the terminal may be turned on in step S401.

After the power supply is turned on, the terminal starts to receive a signal. The terminal first performs PSS detection to perform approximate time and frequency synchronization with respect to the received signal.

The terminal performs cross-correlation of the PSS with respect to the received signal for the PSS detection.

A method for performing, by the terminal, cross-correlation of the PSS will be described in more detail with reference to FIG. 5.

Referring to FIG. 5, one radio frame 501 is configured of 10 subframes 502 to 511. A PSS 512 and an SSS 513 transmitted by the base station for synchronization and cell search of the terminal are transmitted in subframe #0 502 and subframe #5 507. Once the power supply of the terminal is turned on, the terminal attempts PSS detection with respect to a signal received from the base station. At this time, the terminal uses a PSS sequence 523 that the terminal knows to perform cross-correlation with respect to the received signal every sample time. Since the base station uses three sequences for transmitting a PSS ID, the terminal should perform cross-correlation using the three PSS sequences 513 that are known in advance. The terminal performs cross-correlation for the PSS detection using the following Equation (1).

$$y_i(k) = \sum_{n=0}^{N-1} r(n+k) \cdot x_i(n), i = 0, 1, 2 \quad (1)$$

In Equation (1), r(n+k) indicates a received signal received by the terminal in an (n+k)-th sample time. $x_i(n)$ indicates a value of an n-th PSS sequence according to a PSS sequence number i. $y_i(k)$ indicates a result value obtained by performing cross-correlation of the received signal received by the terminal in the k-th sample time and the PSS sequence corresponding to the sequence number i. The PSS may inform the terminal of PSS ID information corresponding to 0 to 2 based on i.

Referring to FIG. 5, the terminal performs cross-correlation using a preset PSS sequence 523 according to Equation 1 during a set search period 515 having a length that may be determined according to a setting to the terminal or a setting of a higher application layer of the terminal. For example, the search period 515 in which cross-correlation is performed needs to be set longer than at least one radio frame 501.

Referring back to FIG. 4, the terminal performs the PSS cross-correlation with respect to the received signal and obtains a result value $y_i(k)$ (hereinafter, a cross-correlation value). Then, the terminal compares cross-correlation value $y_i(k)$ and a specific threshold value Y set in the terminal in step S403.

The specific threshold value Y may be set in the terminal as software or as hardware. In step S403, if cross-correlation value $y_i(k)$ is less than the specific threshold value Y with respect to all PSS IDs, the terminal returns to step S402 in the next time k to continuously perform the PSS cross-correlation with respect to the received signal according to Equation 1. If cross-correlation value $y_i(k)$ is greater than or equal to the specific threshold value Y with respect to at least one PSS ID in step S403, the terminal assumes that the PSS is detected.

As such, when it is assumed that the PSS is detected, the terminal may perform frequency synchronization and detect a PSS ID in step S404.

For example, the terminal may detect a PSS timing 517 at a position where $y_i(k)$ is greater than Y. More specifically, the terminal may perform frame synchronization from a sample time index k when $y_i(k)$ is greater than Y during the search period 515, and may know a position of a frame boundary after the PSS detection based on a position of the PSS in a frame. The terminal may obtain the PSS ID through the PSS sequence index I when $y_i(k)$ is greater than Y in step S404. That is, the PSS sequence index detected at the position of the corresponding PSS timing 517 becomes the PSS ID which is used to detect a cell ID after SSS detection. The terminal may estimate a frequency offset using the detected PSS in step S404.

The terminal that performed the frame synchronization, detected the PSS ID, and estimated the frequency offset using the PSS detected in step S404 performs the SSS detection with respect to the received signal in step S405.

The SSS may have a total of 0 to 167 sequences, and the base station has one sequence according to the cell ID, and generates and transmits the SSS. At this time, the terminal may use the frame synchronization, the PSS ID and the frequency offset estimation value estimated in step S404 in performing the SSS detection. Since the terminal knows a frame timing of the received signal, the terminal receives the signal at a position where the SSS starts. The SSS detection may be performed by performing cross-correlation of all of 168 SS sequences known by the terminal with respect to the received SSS signal to find an index of an SSS sequence in which cross-correlation value is maximum.

Once the SSS detection is completed, the terminal may detect the cell ID using the index of the SSS sequence detected in the previous step in step S406.

The following Equation (2) is used for detecting a cell ID using a PSS ID and an SSS ID.

Cell ID=PSS ID+SSS ID×168    (2)

In Equation (2), the PSS ID indicates the index of the PSS sequence detected by the terminal in step S404. The SSS ID indicates the index of the SSS sequence estimated by the terminal in step S405.

As such, the terminal that estimated the cell ID may complete the time and frequency synchronization with the base station and the cell ID detection, and then perform the PBCH decoding in step S407).

FIGS. 4 and 5 show the flow in which the terminal performs the time and frequency synchronization and cell search using the PSS and SSS transmitted from the base station in the wireless communication system according to the embodiment of the present disclosure. It is appreciated that the terminal may perform the time and frequency synchronization with the base station and detect cell information in the manner that once the power supply of the terminal is turned on, the PSS is first detected, and the SSS is detected based on the information detected through the PSS.

The above-described synchronization process is performed when synchronization with the base station is not performed after the power supply of the terminal is turned on, or when power consumption of the terminal is large. Particularly, considering when it is not possible to know in which cell the terminal is positioned, and the time and the frequency offset amount present between the terminal and the base station, the power consumption of the terminal is relatively large. In addition, since the terminal should perform the PSS cross-correlation using the three sequences to detect the PSS ID, and perform cross-correlation corresponding to a sequence length N with respect to the signal received every sample time, complexity may be significantly increased.

As described above, power consumption in the initial synchronization process may be more severe in the terminal requiring the improvement of the communication coverage. For example, the terminal requiring expanded communication coverage, such as the low-cost terminal, may require accumulation with respect to the PSS and SSS for a longer time in order to secure the coverage. To this end, in the low-cost terminal, the search period 515 for the PSS detection may need to be set to be much greater than one radio frame 510 period.

As an example, if the terminal requires accumulation of the received signal or cross-correlation of the received signal of 100 ms or more in order to secure the communication coverage in the initial synchronization process, power may need to be consumed for a time period 20 times or more than that of the terminal that is not required to secure the coverage. Such power consumption is not preferable for the terminal used for IoT, such as the low-cost terminal. The low-cost terminal aims to be used without replacement of a commercial battery for up to 10 years, thus large power consumption in the transmission and reception process with the base station including the initial synchronization may not satisfy the corresponding requirement. Therefore, in order to satisfy the power consumption requirement of the low-cost terminal, a technology capable of largely reducing the power consumption amount in the initial access process of the low-cost terminal is needed.

Generally, in the initial synchronization process, the terminal uses more power in the PSS detection process than in the SSS detection process. Since the terminal may not receive any information from the base station in the PSS detection process, cross-correlation with respect to the PSS needs to be performed every sample time. In other words, the terminal is required to perform a complex conjugate operation of the PSS sequence length every sample time k for the PSS cross-correlation. However, since the SSS cross-correlation is performed based on the detected frame timing after the PSS detection, the operation amount is very small as compared to the PSS cross-correlation. The PSS sequence includes a real number value, but the SSS sequence has significantly low complexity required for cross-correlation since SSS is a binary sequence. Therefore, in order to reduce power consumption required for the initial access process of the low-cost terminal, a technology for reducing power consumption required for the PSS detection is needed.

Hereinafter, a base station may be at least one of an eNode B, a Node B, a BS, a radio access unit, a base station controller, and a node on a network, as a subject performing resource allocation of a terminal. A terminal may include UE, a mobile station (MS), a cellular phone, a smartphone, a computer, or a multimedia system capable of performing a communication function. In the embodiments of the present disclosure, a downlink indicates a wireless transmission path of a signal transmitted by the base station to the terminal, and an uplink indicates a wireless transmission path of a signal transmitted by the terminal to the base station. Embodiments of the present disclosure will be described with the LTE or LTE-A system by way of example, but may also be applied to other communication systems having similar technical background or channel type through some modification without departing from the scope of the present disclosure based on determination by a person skilled in the art.

If the terminal knows an approximate PSS transmission timing before the PSS detection, power consumption required for the PSS detection may be significantly reduced. That is, as described above with reference to FIG. 5, if the search period 515 for the PSS detection of the terminal is not the radio frame 501 period but is limited to some period in the radio frame 501, the terminal may decrease the operation for cross-correlation, and significantly reduce the complexity and the power consumption amount.

In the conventional LTE-based communication system, the terminal may not know any time and frequency information for the base station before the detection of the PSS transmitted from the base station for the time and frequency synchronization. Thus, it is not possible to know the approximate PSS transmission timing. However, when the PBCH is repetitively transmitted for improving the communication coverage of the low-cost terminal, the terminal may know the approximate transmission timing using repetitive transmission information of the PBCH, such that the method capable of reducing the power consumption amount in the initial synchronization process of the terminal may be possible.

The following is a method in which, the terminal uses the repetitive transmission to learn the approximate PSS transmission timing when the PBCH is repetitively transmitted additionally for improving the communication coverage of the low-cost terminal. In addition, the terminal attempts the PSS detection based on the approximate PSS transmission timing.

Figure 6A:
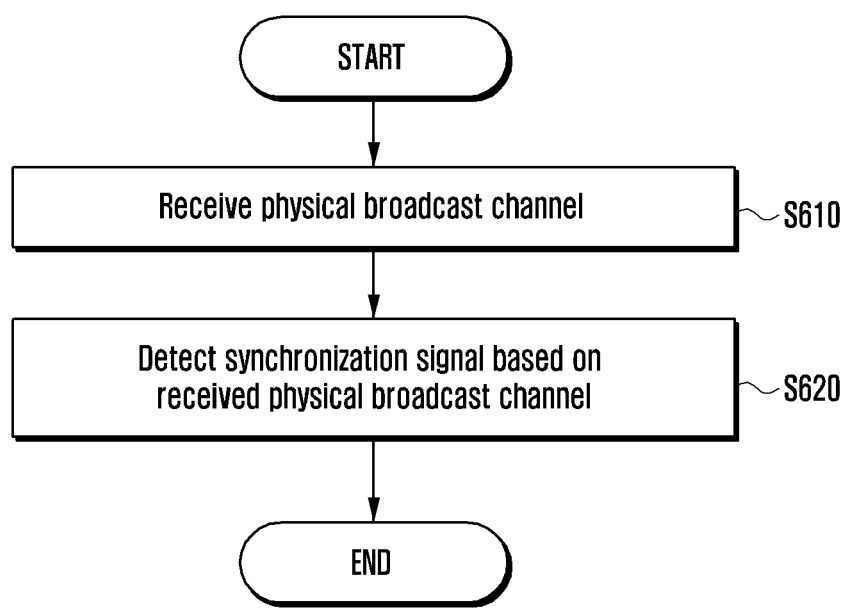
FIG. 6A illustrates a method for detecting, by a terminal, a synchronization signal according to an embodiment of the present disclosure.
Figure 6B:
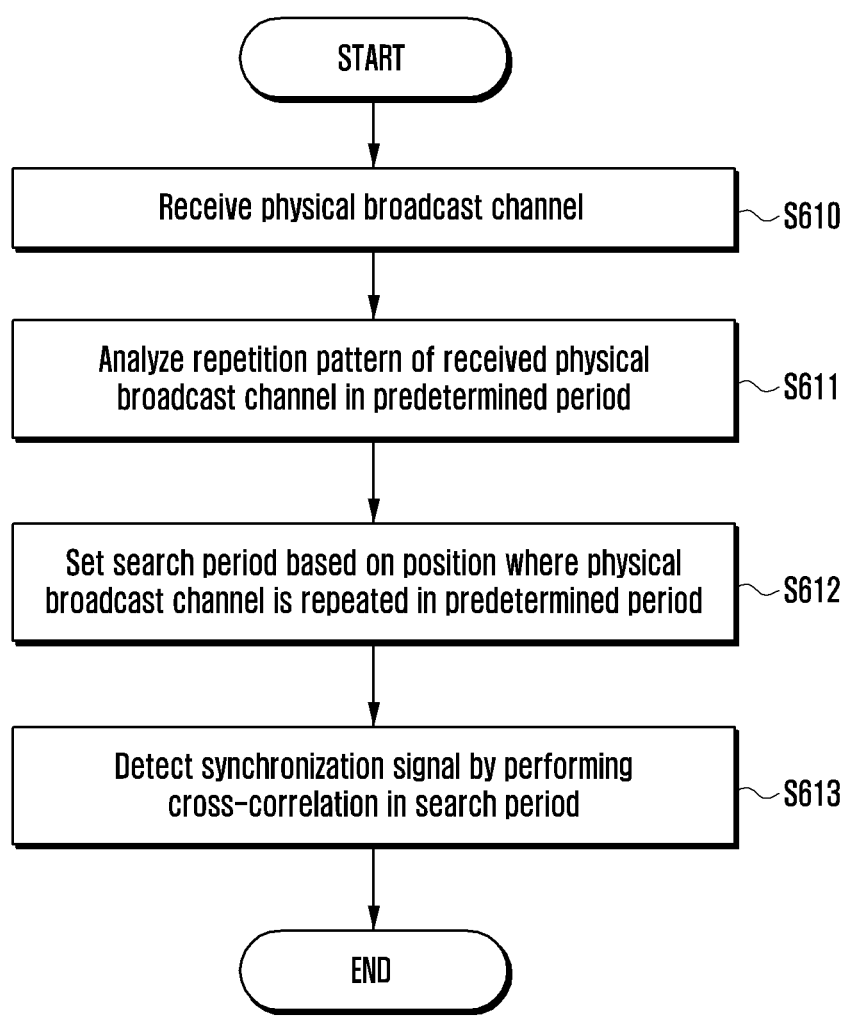
FIG. 6B illustrates the method for detecting a synchronization signal according to FIG. 6A in more detail.

FIG. 6A illustrates a method for detecting, by a terminal, a synchronization signal according to an embodiment of the present disclosure, and FIG. 6B illustrates the method for detecting a synchronization signal according to FIG. 6A in more detail. The expression "physical broadcast channel" and the term "PBCH" may both be used, and a synchronization signal described below may be interpreted as indicating at least one of a PSS and an SSS.

Referring to FIG. 6A, the terminal may receive a physical broadcast channel in step S610.

The base station transmits, through the physical broadcast channel, an MIB including broadcast information required for initial access and communication of the terminal, as described above with reference to FIG. 2.

If the terminal receives the physical broadcast channel, the terminal may detect a synchronization signal based on the received physical broadcast channel in step S620.

More specifically, if the terminal receives the physical broadcast channel, the terminal may analyze a reception pattern of the physical broadcast channel. As described above, the base station may repetitively transmit the physical broadcast channel to improve the communication coverage. For example, the base station may repetitively transmit the physical broadcast channel so that the physical broadcast channel transmitted in a first subframe in one radio frame is also transmitted in a second subframe in the one radio frame, and may repetitively transmits the physical channel so that the physical broadcast channel transmitted in a predetermined symbol period in the first subframe is also transmitted in other symbol periods other than the predetermined symbol period in the first subframe.

As such, if the terminal receives the repetitively transmitted physical broadcast channel, the terminal may analyze a reception pattern of the physical broadcast channel for the predetermined period. That is, the terminal may analyze a reception pattern of the received physical broadcast channel in the predetermined period, which may correspond to one radio frame, such as 10 subframes.

The terminal may set a search period for synchronization signal detection based on a position where the physical broadcast channel is repeated in the predetermined period in step S612.

For example, if the predetermined period corresponds to one radio frame, the terminal may determine positions of subframes in which the physical broadcast channel is repetitively transmitted in one radio frame period, and may determine an interval between subframes in which the physical broadcast channel is repetitively transmitted in one radio frame period. In other words, the terminal may determine relative positions of subframes in which the physical broadcast channel is repetitively transmitted in a period from any reception point in time for signals received from the base station to one radio frame.

More specifically, referring back to FIG. 3, the physical broadcast channel may be repetitively transmitted in each of subframe #0 and subframe #9 in one radio frame, and the terminal may set 10 subframes in two radio frames adjacent to each other in which the physical broadcast channel is transmitted as the predetermined period. In this case, the physical broadcast channel may be repeated transmitted through subframe #9 of the preceding radio frame and subframe #0 of the next radio frame in the predetermined period. The terminal may determine subframes in which the physical broadcast channel is repeated as two continuous subframes, and may determine that the physical broadcast channel is repetitively transmitted through subframe #0 and subframe #9 according to relative positions of subframes.

As such, when the position where the physical broadcast channel is repeated in the predetermined period is determined, the terminal may set a search period for synchronization signal detection based on the position. For example, the terminal may determine an approximate timing of the synchronization signal based on the repetition pattern of the physical broadcast channel in one radio frame and set the search period according to the timing. In the above-described example, if the terminal according to the embodiment of the present disclosure determines that the physical broadcast channel is repetitively transmitted through subframe #0 and subframe #9, a period including positions of subframe #0 and subframe #5 where it is determined that the synchronization signal is transmitted may be set as a search period.

If the search period is set, the terminal according to the embodiment of the present disclosure may perform cross-correlation in the search period and detect the synchronization signal in step S613).

As described above, the power consumption of the low-cost terminal needs to be minimized in performing data transmission and reception with the base station so that the low-cost terminal may be operated for 10 years or more with one battery. Thus, the power consumption of the low-cost terminal needs to be minimized in all circumstances, and the minimized power needs to be used in the initial access process. In the conventional LTE system, since a signal that the terminal performing initial access needs to first detect is a PSS, the PSS detection should be attempted. However, since the largest power is consumed for the PSS detection in the initial access process, the power consumption for the PSS detection may not be minimized. In the initial access process, performance degradation in the PSS detection may occur due to influence of the frequency offset. Thus, a coverage of the PSS detection may be reduced according to the frequency offset.

In order to solve the above-described problem, if the low-low-cost terminal may know a PSS transmission timing with low power using a different downlink signal before the PSS detection, there is a possibility to reduce complexity and power consumption of the terminal. As such, the terminal may first estimate a transmission timing of the physical broadcast channel based on that the synchronization signal and the physical broadcast channel transmitted from the base station are transmitted according to a fixed transmission timing, and estimate a transmission timing of the synchronization signal based on the estimated result. As such, the terminal may perform cross-correlation only with respect to some period in one radio frame according to the approximate timing of the synchronization signal determined based on the repetition pattern of the physical broadcast channel. Thus, the terminal performs cross-correlation with respect to at least one radio frame, thereby eliminating increase of the power consumption amount.

Figure 7A:
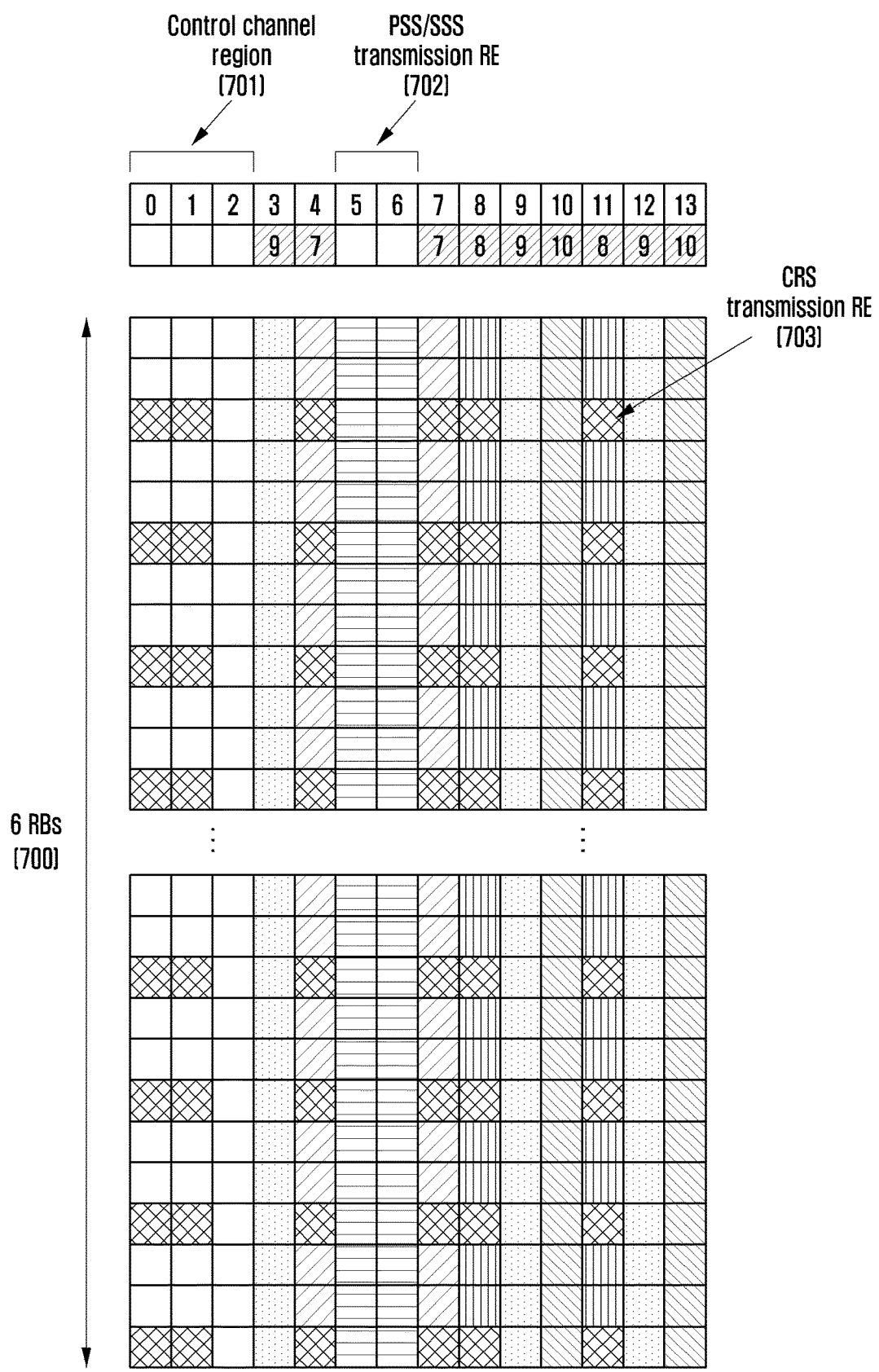
Figure 7B:
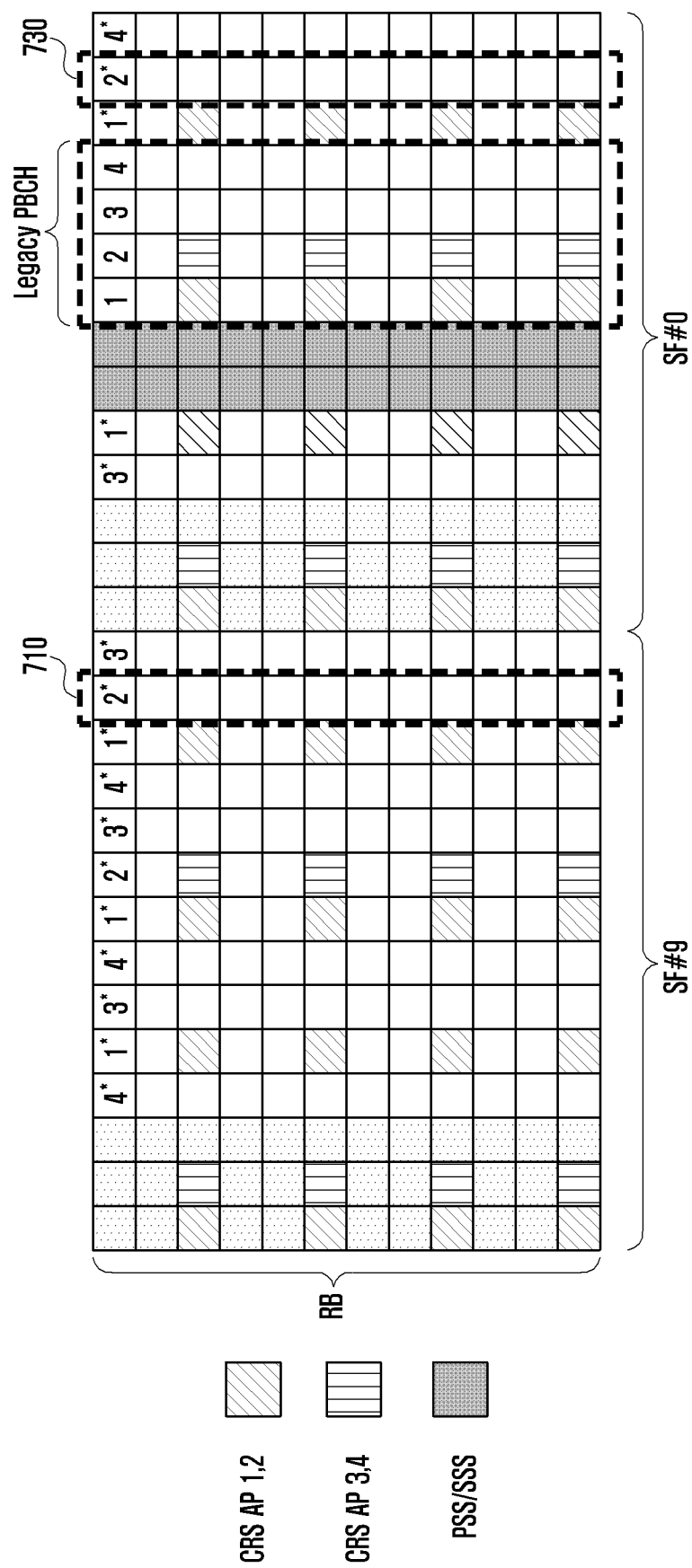

FIGS. 7A, 7B, and 7C illustrate an example of a pattern in which a physical broadcast channel is repeated according to embodiments of the present disclosure As an example, FIG. 7A illustrates a repetition structure of the PBCH in subframe #0 in which the conventional PBCH is transmitted. The repetitive transmission of the PBCH for the coverage expansion may be performed in six RBs positioned in the middle of the same system transmission band with the existing PBCH. In a region in which the PBCH is repetitively transmitted, the repetitive transmission may be performed using all of the REs except for a control channel region 701, an RE 702 for PSS/SSS transmission and an RE 703 for CRS transmission in six resource blocks 700 of subframe #0.

The PBCH may be repeated in the OFDM symbol unit for estimation of the frequency offset. More specifically, among OFDM symbols for transmitting the existing PBCH, an OFDM symbol including the RE for CRS transmission may be mapped to an OFDM symbol including CRS among OFDM symbols that may be used for repetition of the remaining PBCHs so that the PBCH may be repetitively transmitted. For example, in FIG. 7A, a PBCH transmitted in OFDM symbol #7 including CRS may be additionally repetitively transmitted in OFDM symbol #4 including CRS, and a PBCH transmitted in OFDM symbol #8 including CRS may be additionally repetitively transmitted in OFDM symbol #11 including CRS.

Unlike this, among the OFDM symbols for transmitting the existing PBCH, an OFDM symbol that does not include CRS may be mapped to an OFDM symbol that does not include CRS among the OFDM symbols that may be used for repetitive transmission of a PBCH so that the PBCH may be repetitively transmitted. For example, in FIG. 7A, a PBCH transmitted in OFDM symbol #9 that does not include CRS may be additionally repetitively transmitted in at least one of OFDM symbol #3 and OFDM symbol #12 that do not include CRS, and a PBCH transmitted in OFDM symbol #10 that does not include CRS may be mapped to OFDM symbol #13 that does not include CRS and repetitively transmitted.

That is, in one subframe, in repeating the existing PBCH, an OFDM symbol including CRS may be mapped to an OFDM symbol including CRS and the PBCH may be repeated. Alternatively, an OFDM symbol that does not include CRS may be mapped to an OFDM symbol that does not include CRS and the PBCH may be repeated. However, the PBCH repetition mapping pattern of the OFDM symbol unit in FIG. 7A is an example, and the present disclosure may include embodiments in all cases in which mapping is applied in the OFDM symbol unit.

FIGS. 7B and 7C illustrate examples of PBCH repetition mapping pattern different from FIG. 7A. Specifically, FIG. 7B illustrates an example of PBCH repetition mapping in a frequency division duplexing communication system, and FIG. 7C illustrates another example of PBCH repetition mapping in a time division duplexing communication system.

Referring to FIG. 7B, a specific example in which a PBCH is repeated in subframe #0 (SF #0) and subframe #9 (SF #9) in the FDD communication system is disclosed. In FIG. 7B, subframe #9 belongs to a radio frame preceding a radio frame to which subframe #0 belongs.

In principle, even in FIG. 7B, the existing PBCH is repeated in one subframe, and a PBCH transmitted in an OFDM symbol including CRS may be mapped to another OFDM symbol including CRS in the one subframe and repeated as in FIG. 7A. Alternatively, a PBCH transmitted in an OFDM symbol that does not include CRS in one subframe may be mapped to another OFDM symbol that does not include CRS in the one subframe and repeated.

More specifically, the existing PBCH transmitted in OFDM symbol #1 including CRS access points (APs) 1 and 2 in subframe #0 may be mapped to OFDM symbols #1* including CRS APs 1 and 2 in subframe #0 and OFDM symbols #1* including CRS APs 1 and 2 in subframe #9, respectively. The existing PBCH transmitted in OFDM symbol #3 that does not include CRS in subframe #0 may be mapped to OFDM symbols #3* that do not include CRS in subframe #0 and subframe #9, respectively and repetitively transmitted.

Unlike this, referring to 710 and 730 in FIG. 7B, the existing PBCH transmitted in OFDM symbol #2 including CRS APs 1 and 2 in subframe #0 may also be mapped to OFDM symbol #2* 730 that does not include CRS APs 1 and 2 in subframe #0, and OFDM symbol #2* 710 that does not include CRS APs 1 and 2 in subframe #9, respectively and transmitted. For example, if the existing PBCH transmitted in an OFDM symbol including CRS APs 1 and 2 is repetitively transmitted in an OFDM symbol that does not include CRS APs 1 and 2, the repetitive mapping of the existing PBCH may not be made to REs corresponding to CRS APs 1 and 2 in the OFDM symbol in which the PBCH is repeated, or even the CRS may be repeated and mapped to the REs corresponding to CRS APs 1 and 2. In this case, the existing PBCH mapped to REs, adjacent to REs in which CRS APs 1 and 2 are positioned in the OFDM symbol in which the existing PBCH is transmitted, and adjacent REs may be repetitively mapped to the REs corresponding to CRS APs 1 and 2 in the OFDM symbol in which the PBCH is repeated. However, the PBCH mapping pattern in FIG. 7B is as an example, and all examples of any other mapping patterns without departing from the scope of the present disclosure may be included.

FIG. 7C illustrates a specific example in which a PBCH is repeated in subframe #0 (SF #0) and subframe #5 (SF #5) in the TDD communication system. In FIG. 7C, subframe #5 belongs to the same radio frame as a radio frame to which subframe #0 belongs.

Even in FIG. 7C, in repeating the existing PBCH in one subframe, a PBCH transmitted in an OFDM symbol including CRS may be mapped to another OFDM symbol including CRS in one subframe and repeated as in FIG. 7A. A PBCH transmitted in an OFDM symbol that does not include CRS in one subframe may be mapped to another OFDM symbol that does not include CRS in the one subframe and repeated.

Specifically, the existing PBCH transmitted in OFDM symbol #1 including CRS APs 1 and 2 in subframe #0 may be mapped to OFDM symbols #1* including CRS APs 1 and 2 in subframe #0 and subframe #5, respectively and repeatedly transmitted. The existing PBCH transmitted in OFDM symbol #3 that does not include CRS in subframe #0 may be mapped to OFDM symbols #3* that do not include CRS in subframe #0 and subframe #5, respectively and repeatedly transmitted.

Unlike this, referring to 750 and 770 in FIG. 7C, the existing PBCH transmitted in OFDM symbol #2 including CRS APs 1 and 2 in subframe #0 may also be mapped to OFDM symbol #2* 750 that does not include CRS APs 1 and 2 in subframe #0, and OFDM symbol #2* 770 that does not include CRS APs 1 and 2 in subframe #5, respectively and transmitted. For example, if the existing PBCH transmitted in an OFDM symbol including CRS APs 1 and 2 is repetitively transmitted in an OFDM symbol that does not include CRS APs 1 and 2, the repetitive mapping of the existing PBCH may not be made to REs corresponding to CRS APs 1 and 2 in the OFDM symbol in which the PBCH is repeated, or even the CRS APs 1 and 2 may be repeated and mapped to the REs corresponding to CRS APs 1 and 2. In this case, the existing PBCH mapped to REs, adjacent to REs in which CRS APs 1 and 2 are positioned in the OFDM symbol in which the existing PBCH is transmitted, and adjacent REs may be repetitively mapped to the REs corresponding to CRS APs 1 and 2 in the OFDM symbol in which the PBCH is repeated. However, the PBCH mapping pattern in FIG. 7C is an example, and all examples of any other mapping patterns without departing from the scope of the present disclosure may be included.

With reference to FIGS. 7A, 7B, and 7C, the method for repetitively transmitting the PBCH used to transmit an MIB for communication coverage expansion has been described. The terminal according to the embodiment of the present disclosure may determine an approximate PSS transmission timing using a reception pattern of the repetitively transmitted PBCH and may detect the PSS with minimal power consumption using the search period that is set according to the PSS transmission timing.

Figure 9:
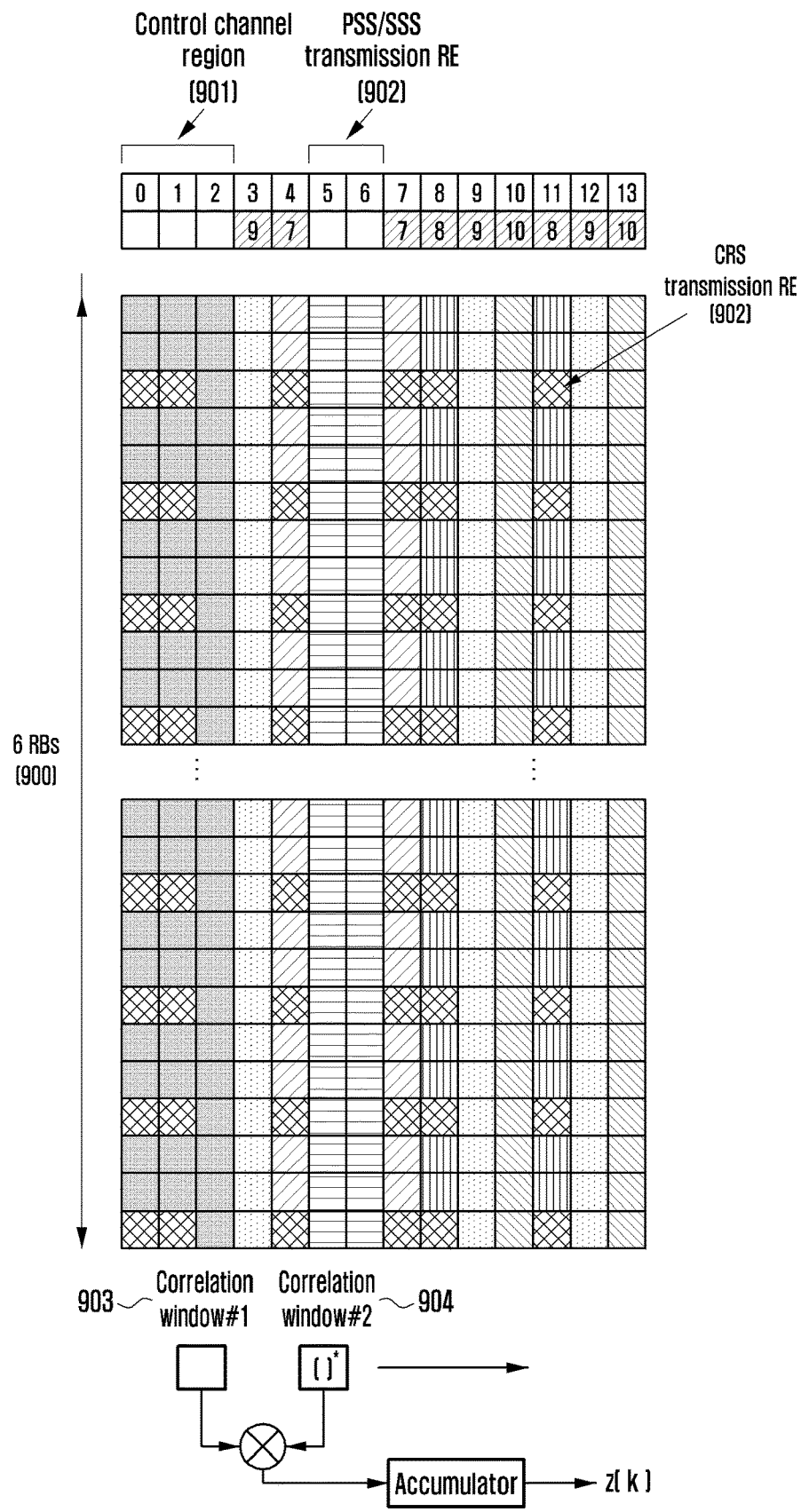
FIG. 9 illustrates a method for analyzing a repetition pattern of a physical broadcast channel.

FIG. 8 illustrates a method for setting a search period according to a repetition pattern of a physical broadcast channel according to an embodiment of the present disclosure, and FIG. 9 illustrates a method for analyzing a repetition pattern of a physical broadcast channel. FIGS. 8 and 9 illustrate a method for detecting, by the terminal, an approximate PSS transmission timing using a PBCH repetition pattern when the base station repetitively transmits the PBCH for the PBCH communication coverage expansion.

Referring to FIG. 8, one radio frame 801 is configured of 10 subframes 802 to 811. A PSS 812 and an SSS 813 transmitted by the base station for synchronization and cell search of the terminal are transmitted in subframe #0 802 and subframe #5 807. A PBCH and a signal through which the PBCH is repetitively transmitted are transmitted in subframe #0 802 and subframe #9 811.

Once a power supply of the terminal is turned on, the terminal may attempt auto-correlation using the PBCH and the repetition signal of the PBCH, instead of attempting PSS detection with respect to the signal received from the base station. For example, as in FIG. 9, in the existing LTE, a PBCH transmitted in a seventh OFDM symbol among fourteen OFDM symbols (#0 to #13) in one subframe may be identically repetitively transmitted in a fourth OFDM symbol. In this case, since the two symbols (fourth OFDM symbol and seventh OFDM symbol) have the same signal characteristic in the time domain, if auto-correlation is used between the two signals, a high correlation value may be obtained.

More specifically, the terminal determines two signals corresponding to different OFDM symbols and performs auto-correlation between the determined two signals to determine whether the two signals have the same signal characteristic. Equation (3) below is used for performing auto-correlation using a property that repeated two signals have the same signal characteristic.

$$z(k) = \sum_{n=0}^{N-1} r(n + K \cdot (N_{FFT} + N_{CP}) + k) \cdot r*(n + k) \quad (3)$$

In Equation (3), r(k) indicates a received signal received by the terminal in a k-th sample time. K indicates an OFDM symbol interval between two signals between which auto-correlation is performed. For example, if auto-correlation between the fourth OFDM symbol and the seventh OFDM symbol in which the PBCH is repetitively transmitted is performed as in FIG. 9, K=3. $N_{FFT}$ indicates a size of FFT used to generate an OFDM signal, and $N_{CP}$ indicates a length of CP. N indicates a size of a window for auto-correlation, and may generally have a value of $N_{FFT}+N_{CP}$. z(k) indicates an auto-correlation value in the k-th sample time. In FIG. 9, a correlation window #1 903 may indicate a signal of $r(n+K(N_{FFT}+N_{CP})+k)$. A correlation window #2 904 indicates a signal of r(n+k). The terminal performs a complex conjugate operation between signals present in two correlation windows and calculates an average during a $N_{FFT}+N_{CP}$ period to derive an auto-correlation value.

At this time, auto-correlation value z(k) may have a maximum value when two correlation windows have the same signal characteristic. FIG. 9 illustrates when auto-correlation is calculated using the same signal characteristic between the fourth OFDM symbol and the seventh OFDM symbol used for the repetitive transmission of the PBCH. However, if performance improvement is required for addition coverage expansion, the terminal may additionally use other OFDM symbol used for the repetitive transmission of the PBCH. For example, auto-correlation can be calculated to determine the same signal characteristic between OFDM symbol #3 and OFDM symbol #9. In this case, K may be 6 in Equation 3, and z(k) according to the respective repetition patterns may be calculated and summed, thereby improving reliability of auto-correlation.

The terminal according to the embodiment of the present disclosure may know an approximate PBCH transmission timing through comparison between a result value of auto-correlation and a preset threshold value, and once the approximate PBCH transmission position is found, a PSS transmission timing may also be estimated. Since there is always a fixed transmission timing between a PSS and a PBCH transmitted from the base station, the terminal estimates a PSS transmission timing based on the estimated PBCH transmission timing.

Auto-correlation has lower complexity than cross-correlation in terms of complexity. Equation (4) recursively expresses Equation (3), as follows.

$$z(k)=z(k-1)+r(K \cdot (N_{FFT}+N_{CP})+k) \cdot r*(k)-r(N+K \cdot (N_{FFT}+N_{CP})+k) \cdot r*(N+k) \quad (4)$$

Auto-correlation according to Equation (3) requires N complex conjugate operations every sample time k. However, according to Equation (4), the same auto-correlation requires only two complex conjugate operations every sample time k. Therefore, the terminal may estimate the approximate PSS transmission timing with minimal operation.

As such, the terminal may obtain auto-correlation value as 814 by calculating auto-correlation using Equation (3) or Equation (4) with respect to every sample using the PBCH repetition pattern known in advance. As illustrated in FIG. 8, the result value of auto-correlation is high in subframe #0 802 and subframe #9 811 in which the PBCH and the PBCH repetition pattern are transmitted.

The terminal compares auto-correlation value with a preset threshold value. If auto-correlation value is greater than the preset threshold value, the terminal may determine an approximate PSS transmission timing, and set a search period for PSS detection based on the approximate PSS transmission timing. More specifically, referring to FIG. 8, the terminal may determine a position where auto-correlation value is greater than the preset threshold value as subframe #0 802 and subframe #9 811, may infer positions of subframe #0 802 and subframe #807 in which the PSS is transmitted based on an approximate subframe position determined by the terminal, and may set a search period 815 for PSS detection based on the inferred positions.

Thereafter, the terminal performs cross-correlation every sample time with respect to a received signal only in search period 815 using a PSS sequence known by the terminal in advance. Cross-correlation performed by the terminal is performed according to Equation (1) described above with reference to FIGS. 4 and 5, and since the base station uses three sequences for transmitting a PSS ID, the terminal should perform cross-correlation using three PSS sequences that are known in advance.

If the approximate PSS search period is set in advance using auto-correlation and the PSS detection is performed in the search period as in FIG. 8, a required complex conjugate amount may be significantly reduced in comparison to the case in which one radio frame period is set as a search period and PSS detection is performed as described with reference to FIG. 5. For example, a required complex conjugate amount when the PSS search period is decreased to 2 subframes using auto-correlation as in FIG. 8 is as shown in Table 3, as follows.

TABLE 3

|  | Conventional method Case where only PSS cross-correlation is used | Present disclosure Case where auto-correlation-cross-correlation are used |
|---|---|---|
| Calculation amount required for auto-correlation | None | Number of multiplication per sample × 10 subframes × number of OFDM symbols per subframe × number of OFDM symbol samples |
| Calculation amount required for cross-correlation | Number of PSS sequences × PSS search period (10 subframes × number of OFDM symbols per subframe × number of OFDM symbol samples) × PSS sequence length | Number of PSS sequences × PSS search period (2 subframes × number of OFDM symbols per subframe × number of OFDM symbol samples) × PSS sequence length |
| Total number of multiplication | 7418880 | 1522416 |

In Table 3, the number of multiplication smaller about 5 times than that of the conventional method is required.

Auto-correlation operations according to Equations (3) and (4) described above may be used by the terminal to estimate a frequency offset with the base station. If phase information is estimated through vector-angle conversion when auto-correlation operation has the maximum value according to Equations (3) and (4), a frequency offset present between the base station and the terminal may be estimated. PSS detection may be more accurately performed when the terminal estimates the frequency offset before PSS detection.

Figure 10:
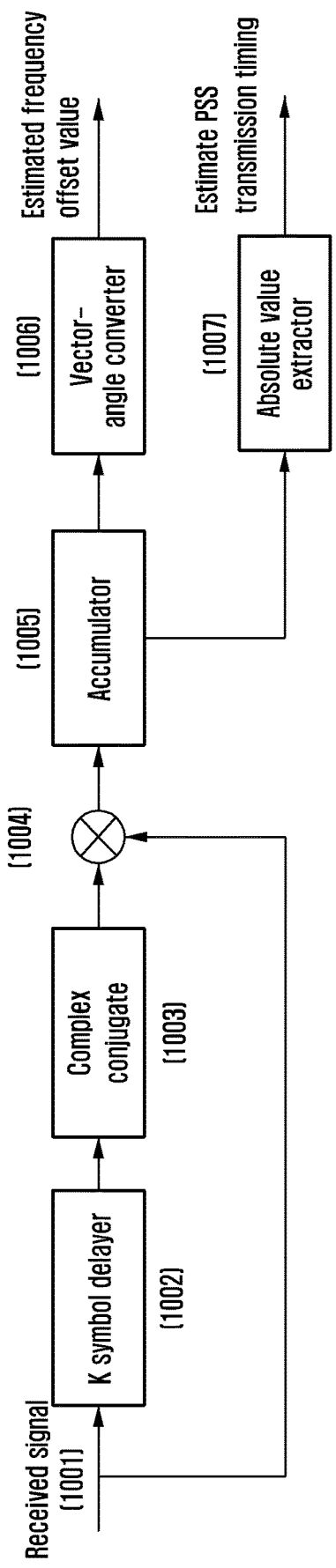
FIG. 10 illustrates a structure of an auto-correlator performing auto-correlation according to an embodiment of the present disclosure.

FIG. 10 illustrates a structure of an auto-correlator performing auto-correlation according to an embodiment of the present disclosure.

An auto-correlator of the terminal according to the present disclosure may include a K symbol delayer 1002, a complex conjugate converter 1003, a complex conjugator 1004, an accumulator 1005, a vector angle converter 1006, and an absolute value extractor 1007.

When a received signal 1001 received by the terminal is input to the auto-correlator, the received signal 1001 is delayed for a K OFDM symbol period in the K symbol delayer 1002. With respect to the received signal delayed as much as the K OFDM symbols, a complex conjugate conversion operation is performed in the complex conjugate converter 1003. The received signal 1001 and an output signal of the complex conjugate converter 1003 are subject to the complex conjugate operation in the complex conjugator 1004, and accumulated in the accumulator 1005 for N samples. When an absolute value of the signal accumulated in the accumulator 1005 is obtained using the absolute value extractor 1007, an auto-correlation value according to the embodiment of the present disclosure is derived.

The terminal compares the signal output from the absolute value extractor 1007 with a preset threshold value, and if the value according to the output signal is greater than the preset threshold value, a PBCH transmission timing and a PSS transmission timing may be estimated as described with reference to FIG. 8.

Auto-correlator of the terminal may estimate a frequency offset by performing vector-angle conversion on the output from the accumulator 1005 using the vector-angle converter 1006 if the value according to the signal output from the absolute value extractor 1007 is greater than the preset threshold value, and may compensate the frequency offset as described above, thereby improving accuracy of PSS detection.

Figure 11:
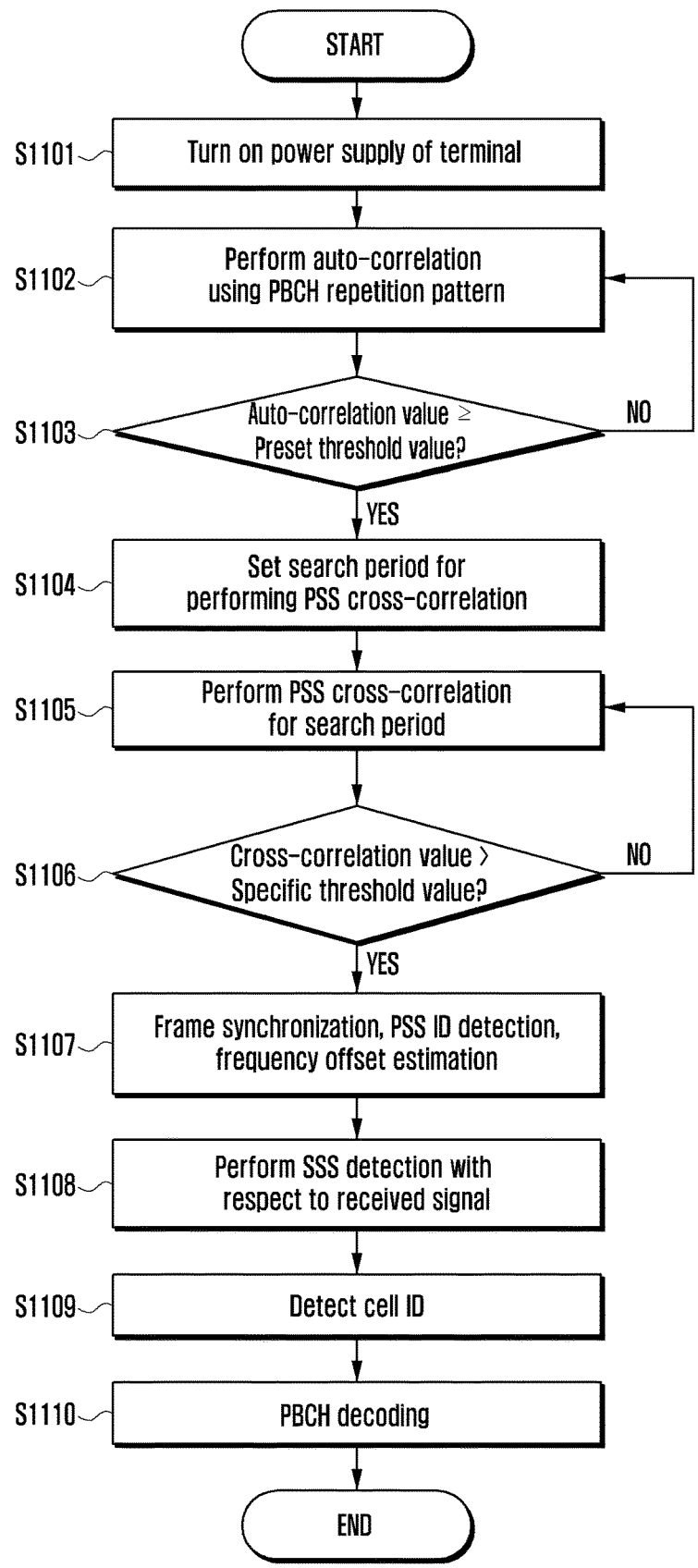
FIG. 11 illustrates a process of performing, by a terminal, time and frequency synchronization and cell search using low power according to an embodiment of the present disclosure.

FIG. 11 illustrates a process of performing, by a terminal, time and frequency synchronization and cell search using low power according to an embodiment of the present disclosure.

Referring to FIG. 11, once the power supply of the terminal is turned on in step S1101, the terminal starts to receive a signal and first performs an auto-correlation operation to perform approximate time and frequency synchronization with respect to the received signal in step S1102. Auto-correlation is performed to determine a repetition pattern of a PBCH, using Equation (3) or (4) described above with reference to FIGS. 8 and 9.

The terminal determines whether an auto-correlation value derived from auto-correlation operation is greater than or equal to a preset threshold value in step S1103. If the result value according to auto-correlation operation is less than the preset threshold value, the terminal returns to step S1102 and continuously perform auto-correlation operation. Unlike this, if the result value is greater than the preset threshold value, the terminal according to the embodiment of the present disclosure sets a search period for performing PSS cross-correlation in step S1105. A short time period including an approximate PSS transmission timing obtained through auto-correlation is set as the search period for the PSS cross-correlation. The terminal performs cross-correlation for PSS detection using a PSS sequence preset in the terminal with respect to the received signal. Cross-correlation may be obtained using Equation (1).

Then, the terminal performs a process of comparing a cross-correlation value $y_i(k)$ and a specific threshold value Y set in the terminal. More specifically, the terminal according to the embodiment of the present disclosure performs a process of determining whether cross-correlation value is greater than the specific threshold value in step S1106. The specific threshold value Y set in the terminal may be set as software or as hardware.

If cross-correlation value $y_i(k)$ is less than the specific threshold value Y with respect to all PSS IDs, the terminal returns to step S1105 in the next time k to continuously perform the PSS cross-correlation with respect to the received signal according to Equation (1).

If cross-correlation value $y_i(k)$ is greater than the specific threshold value Y with respect to at least one PSS ID, the terminal assumes that the PSS is detected and may perform frequency synchronization, detect a PSS ID, and estimate a frequency offset. More specifically, the terminal may perform frame synchronization from a sample time index k when $y_i(k)$ is greater than Y, and may obtain a PSS ID through a PSS sequence index i when $y_i(k)$ is greater than Y. The terminal may estimate a frequency offset using the detected PSS, and may know a position of a frame boundary based on a position of the PSS in a frame after the PSS detection. The terminal uses the PSS ID to detect a cell ID after SSS detection.

As such, the terminal that performed the frame synchronization, detected the PSS ID, and estimated the frequency offset performs the SSS detection with respect to the received signal in step S1108. The SSS may have a total of 0 to 167 sequences, and the base station has one sequence according to the cell ID, and generates and transmits the SSS. The terminal according to the embodiment of the present disclosure may use the frame synchronization, the PSS ID and the frequency offset estimation value estimated in step S1107 in performing the SSS detection.

Since the terminal knows a frame timing of the received signal, the terminal receives the signal at a position where the SSS starts. At this time, the SSS detection may be performed by performing cross-correlation of all of 168 SSS sequences known by the terminal with respect to the received SSS signal to find an index of an SSS sequence in which cross-correlation value is maximum.

Once the SSS is detected, the terminal according to the embodiment of the present disclosure may detect the cell ID using the index of the SSS sequence detected in the previous step. As noted in Equation (2), described above for detecting a cell ID using a PSS ID and an SSS ID, the PSS ID indicates the index of the PSS sequence detected by the terminal in step S1107. The SSS ID indicates the index of the SSS sequence estimated by the terminal in step S1108.

The terminal that estimated the cell ID may complete the time and frequency synchronization with the base station and the cell ID detection, and then perform the PBCH decoding.

Figure 12:
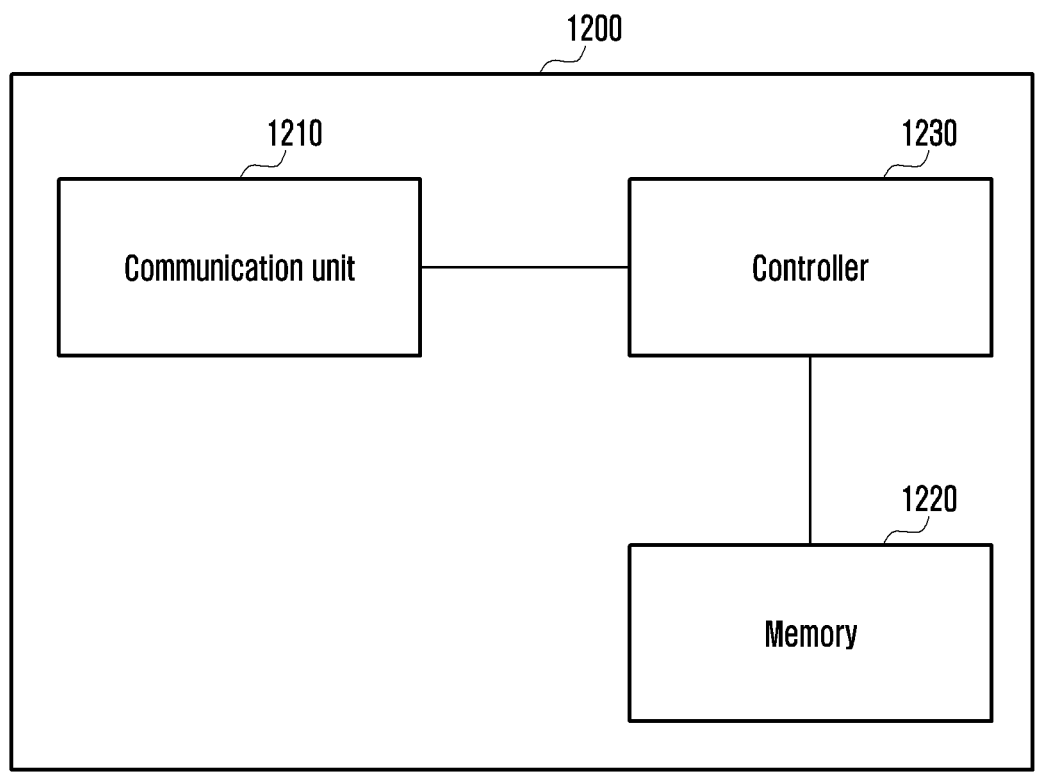
FIG. 12 illustrates a configuration of a terminal according to an embodiment of the present disclosure.

FIG. 12 illustrates a configuration of a terminal according to an embodiment of the present disclosure.

Referring to FIG. 12, a terminal 1200 includes a communication unit 1210, a memory 1220, and a controller 1230.

The communication unit 1210 performs functions for transmitting and receiving a signal through a wireless channel, such as conversion between a baseband signal and a bit string according to a physical layer standard of the system. For example, at the time of data transmission, the communication unit 1210 generates complex symbols by encoding and modulating a transmission bit string. When receiving data, the communication unit 1210 restores a reception bit string by demodulating and decoding the baseband signal, up-coverts the baseband signal into a radio frequency (RF) band signal and then transmits the converted RF band signal through an antenna, and down-converts the RF band signal received through the antenna into the baseband signal. For example, the communication unit 1210 may include a transmission filter, a reception filter, an amplifier, a mixer, an oscillator, a digital to analog converter (DAC), or an analog to digital converter (ADC).

The communication unit 1210 may include a plurality of RF chains and may perform beamforming. For the beamforming, the communication unit 1210 may adjust a phase and size of each of signals transmitted and received through the plurality of antennas or antenna elements. The communication unit 1210 may include a plurality of communication modules to support a plurality of different radio access technologies.

The communication unit 1210 may include a plurality of different communication modules to process signals of different frequency bands. For example, the different communication standards may include Bluetooth low energy (BLE), wireless fidelity (Wi-Fi), WiFi gigabyte (WiFiGig), and a cellular network, such as LTE, and the different frequency bands may include a super high frequency (SHF) band, such as 2.5 or 5 GHz, and millimeter wave (mm wave) band, such as 60 GHz. In particular, the communication unit 1210 may receive a signal including broadcast information from the base station according to various embodiments.

The communication unit 1210 transmits and receives a signal as described above, and may be referred to as a transmitter, a receiver, or a transceiver. Processing for transmission and reception performed through a wireless channel may be performed by the communication unit 1210.

The memory 1220 stores data such as a basic program for operation of the terminal, an application program, and configuration information, and may be configured by a volatile memory, a non-volatile memory, or a combination of the volatile memory and the non-volatile memory. The memory 1220 stores programs and various data related to an operation of receiving broadcast information performed in the communication system according to a control of the controller 1230, and stores a preset threshold value for comparison with an auto-correlation value determined by the controller 1230. The threshold value may be used to determine whether the base station support PBCH coverage expansion through the comparison with the determined auto-correlation value. The memory 1220 provides the stored data in response to a request of the controller 1230.

The controller 1230 controls overall operations of the terminal. For example, the controller 1230 transmits and receives a signal through the communication unit 1210, and records data in the memory 1220 and reads the data. To this end, the controller 1230 may include at least one process or microprocessor, or may be part of a processor. Part of the communication unit 1210 and the controller 1230 may be referred to as a communication processor (CP). In particular, the controller 1230 may control the terminal to perform the operations herein, such as auto-correlation operation with respect to a received signal to determine a search period for PSS detection. The controller 1230 may perform frequency offset estimation and compensation for the received signal based on auto-correlation operation.

The present disclosure may be implemented in other specific forms without changing the spirit or essential feature thereof. Therefore, it should be understood that the above-mentioned embodiments are examples and are not restrictive. It should be interpreted that the scope of the present disclosure is defined by the following claims rather than the above-mentioned detailed description and all modifications or alterations deduced from the meaning, the scope, and equivalences of the claims are included in the scope of the present disclosure.

While the present disclosure has been shown and described in embodiments thereof, it will be understood by those skilled in the art that various changes in form and detail may be made therein without departing from the spirit and scope of the present disclosure as defined by the appended claims and their equivalents.

What is claimed is:

1. A method of a terminal in a wireless communication system, the method comprising:
   identifying a periodicity and pattern for a physical broadcast channel (PBCH) including a master information block (MIB), in case of an initial access, wherein the periodicity and pattern for the PBCH is predetermined;
   identifying time resources for a synchronization signal based on the periodicity and pattern for the PBCH;

detecting the synchronization signal based on the time resources; and receiving the MIB on the PBCH based on the synchronization signal, wherein the periodicity is a multiple of a radio frame.

2. The method of claim 1, wherein the periodicity is one radio frame, and wherein positions where the PBCH is repeated are included in subframes in the one radio frame.

3. The method of claim 2, wherein the time resources is determined based on positions of the subframes and an interval between the subframes in the one radio frame.

4. The method of claim 2, wherein the subframes are determined based on comparison between an auto-correlation value and a preset threshold value, and wherein the auto-correlation value is derived based on a first signal component corresponding to the PBCH and a second signal component corresponding to a repeated PBCH.

5. The method of claim 4, wherein the subframes including an orthogonal frequency division multiplexing (OFDM) symbol corresponding to the first signal component and an OFDM symbol corresponding to the second signal component is determined as the position where the physical broadcast channel is repeated, if the auto-correlation value is greater than the preset threshold value.

6. The method of claim 4, wherein each of the first signal component and the second signal component is corresponding to an orthogonal frequency division multiplexing (OFDM) symbol in subframe, and wherein the auto-correlation value is determined based on interval between an OFDM symbol corresponding to the first signal component and an OFDM symbol corresponding to the second signal component.

7. The method of claim 1, wherein detecting the synchronization signal further includes:

deriving a cross-correlation value using a signal corresponding to the time resources and a preset sequence; and detecting the synchronization signal based on comparison between the cross-correlation value and a specific threshold value.

8. The method of claim 7, wherein the synchronization signal is detected based on a reception time of the signal corresponding to the time resources when the cross-correlation value is greater than the specific threshold value.

9. A terminal performing wireless communication, the terminal comprising:

a communication unit and a controller coupled with the communication unit and configured to:

identify a periodicity and pattern for physical broadcast channel (PBCH) including a master information block (MIB), in case of an initial access, wherein the periodicity and pattern for the PBCH is predetermined, identify time resources for a synchronization signal based on the periodicity and pattern for the PBCH, detect the synchronization signal based on the time resources, and receive the MIB on the PBCH based on the synchronization signal, wherein the periodicity is a multiple of a radio frame.

10. The terminal of claim 9, wherein the periodicity is one radio frame, and wherein positions where the PBCH is repeated are included in subframes in the one radio frame.

11. The terminal of claim 10, wherein the controller is further configured to determine the time resources based on positions of the subframes and an interval between the subframes in the one radio frame.

12. The terminal of claim 10, wherein the controller is further configured to determine the subframes are determined based on comparison between an auto-correlation value and a preset threshold value, and wherein the auto-correlation value is derived based on a first signal component corresponding to the PBCH and a second signal component corresponding to a repeated PBCH.

13. The terminal of claim 12, wherein the controller is further configured to determine the subframes including an orthogonal frequency division multiplexing (OFDM) symbol corresponding to the first signal component and an OFDM symbol corresponding to the second signal component is determined as the position where the physical broadcast channel is repeated, if the auto-correlation value is greater than the preset threshold value.

14. The terminal of claim 12, wherein each of the first signal component and the second signal component is corresponding to an orthogonal frequency division multiplexing (OFDM) symbol in subframe, and wherein the auto-correlation value is determined based on interval between an OFDM symbol corresponding to the first signal component and an OFDM symbol corresponding to the second signal component.

15. The terminal of claim 9, wherein the controller is further configured to:

derive a cross-correlation value using a signal corresponding to the time resources and a preset sequence, and detect the synchronization signal based on comparison between the cross-correlation value and a specific threshold value.

16. The terminal of claim 15, wherein the controller is further configured to detect the synchronization signal based on a reception time of the signal corresponding to the time resources when the cross-correlation value is greater than the specific threshold value.

* * * * *